US010233342B2

(12) United States Patent
Xu et al.

(10) Patent No.: US 10,233,342 B2
(45) Date of Patent: Mar. 19, 2019

(54) POLYMERS FOR INKJET INK COMPOSITIONS

(71) Applicant: Cabot Corporation, Boston, MA (US)

(72) Inventors: Jinqi Xu, Westford, MA (US); Paul S. Palumbo, West Newton, MA (US); Andrea Lebed, Somerville, MA (US); Heather E. Clarke, Lancaster, MA (US); Alexander I. Shaknovich, Arlington, MA (US); Tianqi Liu, Boxborough, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 15/950,718

(22) Filed: Apr. 11, 2018

(65) Prior Publication Data

US 2018/0230322 A1    Aug. 16, 2018

Related U.S. Application Data

(62) Division of application No. 15/798,973, filed on Oct. 31, 2017.

(60) Provisional application No. 62/415,154, filed on Oct. 31, 2016.

(51) Int. Cl.
| | |
|---|---|
| *C09D 11/106* | (2014.01) |
| *C08F 222/08* | (2006.01) |
| *C09D 11/322* | (2014.01) |
| *C09D 135/00* | (2006.01) |
| *C09D 11/107* | (2014.01) |
| *C09D 11/326* | (2014.01) |
| *C08F 8/40* | (2006.01) |

(52) U.S. Cl.
CPC ............. *C09D 11/106* (2013.01); *C08F 8/40* (2013.01); *C08F 222/08* (2013.01); *C09D 11/107* (2013.01); *C09D 11/322* (2013.01); *C09D 11/326* (2013.01); *C09D 135/00* (2013.01); *C08F 2810/20* (2013.01)

(58) Field of Classification Search
CPC .................................................. C09K 11/106
USPC ........................................................ 523/160
See application file for complete search history.

(56) References Cited

U.S. PATENT DOCUMENTS

| | | | |
|---|---|---|---|
| 3,687,887 A | 8/1972 | Zabiak | |
| 5,596,027 A | 1/1997 | Mead et al. | |
| 5,854,191 A | 12/1998 | Krause et al. | |
| 6,090,193 A | 7/2000 | Nigam et al. | |
| 6,210,473 B1 | 4/2001 | Boils et al. | |
| 6,509,414 B2 | 1/2003 | Tikart et al. | |
| 7,008,994 B1 | 3/2006 | Waki | |
| 7,501,017 B2 | 3/2009 | Sarkisian et al. | |
| 7,655,707 B2 | 2/2010 | Ma | |
| 9,028,056 B1 | 5/2015 | Naruse et al. | |
| 9,217,089 B2 | 12/2015 | Nagai et al. | |
| 2004/0265348 A1 | 12/2004 | Hollenberg et al. | |
| 2006/0235108 A1 | 10/2006 | Koganehira | |
| 2007/0100023 A1 | 5/2007 | Burns et al. | |
| 2007/0100024 A1 | 5/2007 | Gu et al. | |
| 2010/0171070 A1 | 7/2010 | Taboada et al. | |
| 2012/0116012 A1* | 5/2012 | Ganapathiappan | C09C 3/10 524/555 |
| 2012/0200651 A1* | 8/2012 | Sasada | B41M 5/0017 347/102 |
| 2013/0214197 A1 | 8/2013 | Spinelli | |
| 2013/0225739 A1* | 8/2013 | Spinelli | C09D 11/30 524/365 |
| 2016/0130452 A1 | 5/2016 | Katoh et al. | |

FOREIGN PATENT DOCUMENTS

| | | |
|---|---|---|
| CN | 104861101 A | 8/2015 |
| EP | 1086975 A1 | 3/2001 |
| EP | 1088865 A1 | 4/2001 |
| EP | 2754679 A1 | 7/2014 |
| JP | S 5636504 A | 4/1981 |
| WO | WO 95/04109 A1 | 2/1995 |
| WO | WO 2008/077829 A1 | 7/2008 |

OTHER PUBLICATIONS

The International Search Report and the Written Opinion of International Application No. PCT/US2017/059227, dated Jul. 5, 2018.

* cited by examiner

*Primary Examiner* — Doris L Lee

(57) ABSTRACT

Disclosed herein are polymers, which can be incorporated in pigment dispersions and inkjet ink compositions, comprising first monomers selected from ethylenically unsaturated hydrophobic monomers, and second monomers selected from maleic anhydride, maleic acid, and salts, esters, imides, and amides thereof. The polymers can have a portion of the second monomers functionalized with at least one organic group having a calcium index value greater than or equal to a calcium index value of phenylphosphonic acid. Additionally and/or alternatively, the at least one polymer can be crosslinked via the second monomers. Dispersions and inkjet ink compositions comprising such polymers can also further comprise at least one pigment and a liquid vehicle. Also disclosed are methods of making such polymers.

29 Claims, 1 Drawing Sheet

001# POLYMERS FOR INKJET INK COMPOSITIONS

FIELD OF THE INVENTION

Figure 1A:
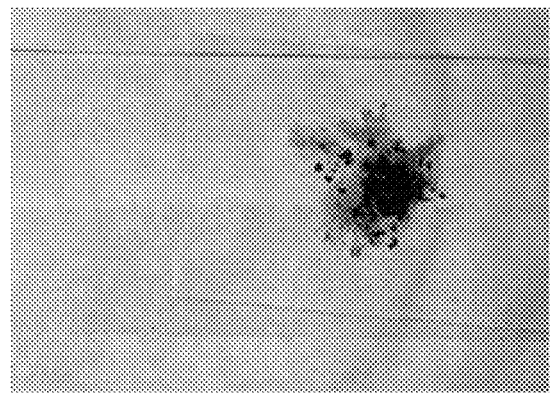

Disclosed herein are polymers comprising ethylenically unsaturated hydrophobic monomers and maleic anhydride and/or maleic acid (or salts, esters, imides, and amides thereof) monomers, as well as compositions comprising such monomers, which can be useful in inkjet ink applications.

BACKGROUND

In inkjet printing of pigment-based inks, individual ink droplets are deposited on a substrate with the aim of quickly forming pigment aggregates on the substrate. This process can be challenging for plain papers and coated papers including those with low solute salts such as calcium and magnesium salts. Slow pigment aggregation can lead to average or below average image quality as indicated by low optical density, bad mottle, etc.

Other challenges include maintaining the stability of such pigment-based dispersions. Accordingly, there is a need to develop new pigment-based inkjet ink compositions to address these challenges.

SUMMARY

One embodiment provides a polymer comprising, consisting essentially of, or consisting of:

first monomers selected from ethylenically unsaturated hydrophobic monomers, and second monomers selected from maleic anhydride, maleic acid, and salts, esters, imides, and amides thereof, wherein at least one portion of the second monomers is functionalized with at least one organic group having a calcium index value greater than a calcium index value of phenylphosphonic acid.

Another embodiment provides a composition comprising, consisting essentially of, or consisting of:

at least one pigment;
a liquid vehicle; and
at least one polymer comprising first monomers selected from ethylenically unsaturated hydrophobic monomers, and second monomers selected from maleic anhydride, maleic acid, and salts, esters, imides, and amides thereof, wherein a portion of the second monomers are functionalized with at least one organic group having a calcium index value greater than or equal to a calcium index value of phenylphosphonic acid.

Another embodiment provides a composition comprising, consisting essentially of, or consisting of:

at least one pigment;
a liquid vehicle; and
at least one polymer encapsulating the at least one pigment wherein the at least one polymer comprises first monomers selected from ethylenically unsaturated hydrophobic monomers, and second monomers selected from maleic anhydride, maleic acid, and salts, esters, imides, and amides thereof, wherein the ethylenically unsaturated hydrophobic monomers comprise the formula $CH_2=CR^1R^2$, where $R^1$ and $R^2$ are independently selected from H, $C_1$-$C_{12}$ alkyl, $C_5$-$C_{20}$ aryl, and $C_6$-$C_{20}$ alkaryl, and the carbon atoms of $R^1$ and $R^2$ can be optionally substituted with at least one heteroatom selected from O, N, and S, and wherein the at least one polymer is crosslinked via the second monomers.

Another embodiment provides a method of making a polymer (e.g., a polymer capable of binding a divalent metal ion, such as a calcium and/or magnesium binding polymer) comprising:

(a) combining:
  (i) at least one polymer comprising first monomers selected from ethylenically unsaturated hydrophobic monomers, and second monomers selected from maleic anhydride, maleic acid, and salts, esters, imides, and amides thereof, and
  (ii) at least one reagent comprising an amino group and at least one organic group having a calcium index value greater than a calcium index value of phenylphosphonic acid; and
(b) forming the polymer.

Another embodiment provides a method of making a polymer comprising, (a) combining:
  (i) at least one polymer comprising first monomers selected from ethylenically unsaturated hydrophobic monomers, and second monomers selected from maleic anhydride, maleic acid, and salts, esters, imides, and amides thereof, wherein the ethylenically unsaturated hydrophobic monomers comprise the formula $CH_2=CR^1R^2$, where $R^1$ and $R^2$ are independently selected from H, $C_1$-$C_{12}$ alkyl, $C_5$-$C_{20}$ aryl, and $C_6$-$C_{20}$ alkaryl, and the carbon atoms of $R^1$ and $R^2$ can be optionally substituted with at least one heteroatom selected from O, N, and S, and
  (ii) at least one crosslinking agent selected from epoxy-containing compounds; and
(b) forming the polymer.

BRIEF DESCRIPTION OF THE DRAWING(S)

Figure 1B:
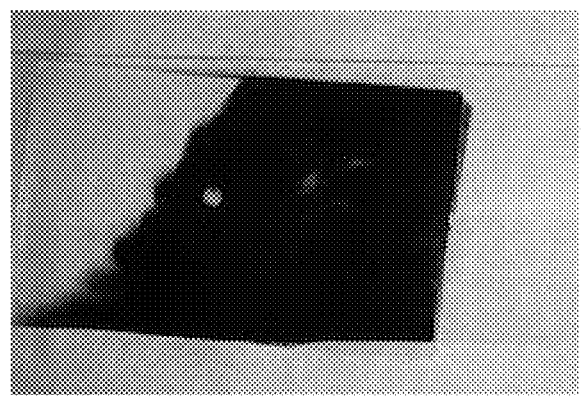

FIG. 1A is a photograph of PigDisp-27 upon exposure to dipropylene glycol on a microscopic slide; and
FIG. 1B is a photograph of PigDisp-28 upon exposure to dipropylene glycol on a microscopic slide.

DETAILED DESCRIPTION

Disclosed herein are compositions comprising, consisting essentially of, or consisting of:

at least one pigment;
a liquid vehicle; and
at least one polymer that is crosslinked and/or capable of binding calcium and/or other divalent metals.

In one embodiment, the at least one polymer is capable of binding calcium and/or other divalent metals. In one embodiment, the at least one polymer comprises first monomers selected from ethylenically unsaturated hydrophobic monomers, and second monomers selected from maleic anhydride, maleic acid, and salts, esters, imides, and amides thereof, wherein a portion of the second monomers is functionalized with at least one organic group having a calcium index value greater than or equal to a calcium index value of phenyl phosphonic acid. In one embodiment, the least one organic group has a calcium index value greater than or equal to a calcium index value of 1,2,3-benzene tricarboxylic acid.

Another embodiment provides a composition comprising, consisting essentially of, or consisting of:

at least one pigment;
a liquid vehicle; and at least one polymer encapsulating the at least one pigment wherein the at least one polymer comprises first monomers selected from ethylenically unsaturated hydrophobic monomers, and second monomers selected from maleic anhydride, maleic acid, and salts, esters, imides, and amides thereof, wherein the ethylenically unsaturated hydrophobic monomers comprise the formula $CH_2=CR^1R^2$, where $R^1$ and $R^2$ are independently selected from H, $C_1-C_{12}$ alkyl, $C_5-C_{20}$ aryl, and $C_6-C_{20}$ alkaryl, and the carbon atoms of $R^1$ and $R^2$ can be optionally substituted with at least one heteroatom selected from O, N, and S, and wherein the at least one polymer is crosslinked via the second monomers.

In one embodiment, a composition comprising the at least one polymer encapsulating the pigment exhibits enhanced stability relative to a composition comprising a self-dispersed pigment and/or a composition comprising a pigment and a polymeric dispersant comprising the same monomers, where the polymeric dispersant is not crosslinked.

In one embodiment, an "ethylenically unsaturated" monomer contains a polymerizable C=C group. Exemplary ethylenically unsaturated hydrophobic monomers include acrylate and methacrylate acid groups, vinyl groups, and allyl groups. In one embodiment, the ethylenically unsaturated hydrophobic monomers have the formula $CH_2=CR^1R^2$, wherein $R^1$ and $R^2$ are independently selected from H, $C_1-C_{20}$ alkyl (e.g., $C_1-C_{12}$ or $C_1-C_6$ alkyl), $C_5-C_{20}$ aryl (e.g., $C_5-C_{12}$ aryl, $C_6-C_{12}$ aryl, $C_5-C_{10}$ aryl, $C_6-C_{10}$ aryl), $C_6-C_{20}$ aralkyl (aryl-substituted alkyl, e.g., $C_6-C_{12}$ aralkyl, $C_6-C_{10}$ aralkyl), and $C_6-C_{20}$ alkaryl (alkyl-substituted aryl, e.g., $C_6-C_{12}$ alkaryl, $C_6-C_{10}$ alkaryl). $R^1$ and $R^2$ can be linear or branched. In one embodiment, the carbon atoms of $R^1$ and $R^2$ can be optionally substituted with at least one heteroatom selected from O, N, and S. In one embodiment, $R^1$ and $R^2$ are independently selected from H, $C_1-C_{12}$ alkyl, $C_5-C_{20}$ aryl, $C_6-C_{20}$ aralkyl, and $C_6-C_{20}$ alkaryl. In another embodiment, $R^1$ and $R^2$ are independently selected from H, $C_1-C_{12}$ alkyl, $C_6-C_{12}$ aryl, $C_6-C_{12}$ aralkyl, and $C_6-C_{12}$ alkaryl. In yet another embodiment, $R^1$ and $R^2$ are independently selected from H, $C_1-C_{12}$ alkyl, and $C_5-C_{12}$ aryl (e.g., $C_5-C_{10}$ aryl) or H, $C_1-C_{12}$ alkyl, and $C_6-C_{12}$ aryl (e.g., $C_6-C_{10}$ aryl). In yet another embodiment, $R^1$ and $R^2$ are independently selected from H and $C_5-C_{12}$ aryl (e.g., $C_5-C_{10}$ aryl) or H and $C_6-C_{12}$ aryl (e.g., $C_6-C_{10}$ aryl).

In one embodiment, the ethylenically unsaturated hydrophobic monomers are selected from those containing vinyl groups, e.g., α-olefins. Exemplary monomers containing vinyl groups include ethylene, propylene, 1-butene, 1-pentene, 1-hexene, 1-heptene, 1-octene, 1-nonene, 1-decene, 1-dodecene, 1-tetradecene, 1-hexadecene, 1-heptadecene, 1-octadecene, 2-methyl-1-butene, 3,3-dimethyl-1-pentene, 2-methyl-1-heptene, 4,4-dimethyl-1-heptene, 3,3-dimethyl-1-hexene, 4-methyl-1-pentene, isobutylene, di-isobutylene, styrene, α-methyl styrene, and vinyl toluene and mixtures thereof.

In one embodiment, the ethylenically unsaturated hydrophobic monomers are selected from ethylenically unsaturated esters, e.g., ethylenically unsaturated esters of an aliphatic acid wherein the acid moiety has 3-8 carbon atoms, e.g., 3-6 carbon atoms, and the ester moiety has 1-8, e.g., 1-6 or 1-4 carbon atoms. Exemplary ethylenically unsaturated esters include vinyl acetate, allyl acetate, methyl methacrylate, ethyl acrylate, n-butyl acrylate, n-butyl methacrylate, n-octyl acrylate, benzyl acrylate, acrylonitrile, and, acrylamide. In one embodiment, the first monomers can comprise two or more different ethylenically unsaturated hydrophobic monomers.

In one embodiment, the ethylenically unsaturated hydrophobic monomers are selected from styrene, α-methyl styrene, ethylene, propylene, 1-butylene, isobutylene, butadiene, methyl vinyl ether. In one embodiment, the ethylenically unsaturated hydrophobic monomers are selected from styrene and α-methyl styrene.

In one embodiment, the second monomers are selected from maleic anhydride, maleic acid, and salts, esters, imides, and amides thereof, e.g., selected from maleic anhydride, maleic acid, and salts thereof. For example, the second monomers can comprise maleic anhydride, or maleic acid, or a mixture of maleic anhydride and maleic acid (and/or salts, esters, imides, and amides thereof). The second monomers can be unsubstituted (other than the portion functionalized with the at least one organic group). Alternatively, the second monomers can be substituted, e.g., with at least one group selected from $C_1-C_6$ alkyl and halide. Exemplary substituted second monomers include methylmaleic anhydride, dimethylmaleic anhydride, fluoromaleic anhydride, and methylethyl maleic anhydride.

In one embodiment, the second monomers are present in the at least one polymer in an amount ranging from 10 to 60 mol % relative to the at least one polymer, e.g., an amount ranging from 10 to 50 mol %, from 10 to 40 mol %, from 10 to 35 mol %, from 20 to 60 mol %, from 20 to 50 mol %, from 20 to 40 mol %, from 20% to 35 mol % relative to the at least one polymer. In one embodiment, the at least one polymer comprises the first monomers in an amount ranging from 40 to 90 mol %, from 50 to 90 mol %, 40 to 80 mol %, or from 50 to 80 mol %. In another embodiment, the at least one polymer comprises the first monomers in an amount ranging from 67 to 80 mol % and second monomers in an amount ranging from 20 to 33 mol % relative to the at least one polymer. The at least one polymer can be a random copolymer or alternating copolymer.

In one embodiment, the first monomers are selected from styrene. In one embodiment, the at least one polymer is selected from styrene-maleic anhydride (SMA) polymers in which a portion of the maleic anhydride monomers are functionalized with the at least one organic group. In one embodiment, the styrene-maleic anhydride polymer can be prepared by the polymerization of styrene or a styrenic monomer and maleic anhydride or derivatives thereof. For example, the styrene-maleic anhydride polymer may be a copolymer of styrene and maleic anhydride. In one embodiment, some or all of the maleic anhydride monomers are hydrolyzed to maleic acid, resulting in a polymer comprising styrene, maleic anhydride, and maleic acid (and salts thereof) monomers. Additional monomers, such as acrylate and methacrylates, may also be present. In one embodiment, the additional monomers are present in low levels. For example, the styrene-maleic anhydride polymers can be a polymer of styrene, maleic anhydride, and an additional monomer having a mole ratio of polymerized styrene and maleic anhydride to other polymerized monomer that is greater than 1/1, such as greater than 5/1, greater than 10/1, and greater than 20/1. Such polymers can be prepared using any method known in the art, including polymerization using a continuous monomer feed as well as using a one-pot polymerization process. In one embodiment, the styrene-maleic anhydride polymer is prepared with a continuous monomer feed method.

Other examples of styrene-maleic anhydride polymers include functionalized styrene-maleic anhydride polymers (in addition to the portion functionalized with the at least one organic group), which are polymers prepared by the polymerization of styrene and maleic anhydride monomers that have been further reacted, for example, with alcohols to form ester groups or with amines to form amide or imide groups. Specific examples of functionalized styrene-maleic anhydride polymers include polymers comprising styrene monomers and monomers of the half ester or amide of polymerized maleic anhydride (thus comprising monomers comprising formulas such as —(CH(COOH)—CH(COOR)— or —(CH(COOH)—CH(CONR$_2$)—, wherein R is selected from $C_1$-$C_{20}$ alkyl, aralkyl, alkaryl, and aryl groups, e.g., selected from $C_6$-$C_{18}$, alkyl, aralkyl, and aryl groups. Partially functionalized styrene-maleic anhydride polymers can also be used, in which some, but not all of the polymerized maleic anhydride monomers have been functionalized. Examples of these polymers include styrene-maleic anhydride-maleic acid ester polymers and styrene-maleic anhydride-maleic acid amide polymers. In addition, polymers comprising monomers of polymerized styrene and monomers of the imide of polymerized maleic anhydride may also be used.

The at least one polymer may be prepared using conventional polymerization techniques. Alpha olefin maleic anhydride copolymers, e.g., may be prepared by any of a number of conventional polymerization processes including those as set forth in U.S. Reissue Pat. No. Re. 28,475 and U.S. Pat. Nos. 3,553,117, 3,560,455, 3,560,456, 3,560,457, 3,488,311, 4,522,992, 4,358,573, 4,871,823, 4,859,752, and 5,336,727, the disclosures of which are incorporated herein by reference. The at least one polymer can be prepared, for example, in neat alkenes at 160° C.; in solvents such as the aromatic hydrocarbons that dissolve the monomers but precipitate the polymers (precipitation polymerization or suspension polymerization); or in solvents such as the ketones that dissolve both the reactants and the polymers (solution polymerization). In one embodiment, temperature for solution polymerization ranges from 60-80° C. The radical initiators are usually AIBN or benzoyl peroxide.

In one embodiment, a portion of the second monomers is functionalized with at least one organic group having a calcium index value greater than or equal to a calcium index value of phenylphosphonic acid. In one embodiment, the at least one organic group is capable of binding calcium and/or other divalent metals. In one embodiment, the binding capability of divalent metals can be quantified via calcium index values, as described in U.S. Pat. No. 8,858,695, the disclosure of which is incorporated herein by reference. "Calcium index value" refers to a measure of the ability of an organic group to coordinate or bind calcium ions in solution. The higher the calcium index value, the more strongly or effectively the group can coordinate calcium ions. Calcium index values can also be used to indicate binding capability of other divalent metal ions, e.g., magnesium.

Calcium index values can be determined by any method known in the art. For example, the calcium index value may be measured with a method in which the amount of calcium coordinated by a compound in a standard solution containing soluble calcium ions and a color indicator is measured using UV-Vis spectroscopy. Alternatively, for compounds having a strong color, the calcium index value may be measured using an NMR method.

In one embodiment, "calcium index value," is according to the methods (described in U.S. Pat. No. 8,858,695, e.g., Method A or Method B at col. 29, line 45 to col. 31, line 37, the disclosure of which is incorporated herein by reference. For either method used, a compound was chosen that corresponds to a desired organic group to be tested. In the test compound, the at least one organic group can be bonded to any residue so long as the atoms responsible for binding calcium ions are separated from the residue by at least two bonds. The residue can comprise or consist of hydrogen, a $C_1$-$C_{10}$ alkyl (substituted or unsubstituted), or $C_4$-$C_{18}$ aryl (substituted or unsubstituted), e.g., the compound to be tested can comprise the organic group bonded to hydrogen, a $C_1$-$C_{10}$ alkyl (substituted or unsubstituted), or $C_4$-$C_{18}$ aryl (substituted or unsubstituted). For example, for a 3,4,5-tricarboxyphenyl functional group and salts thereof, 1,2,3-benzene tricarboxylic acid can be chosen. In this example, the residue is hydrogen and the oxygen atoms of the carboxylic acids are at least two bonds away from the hydrogen residue.

In one embodiment, reference to the calcium index value means that the value is greater than or equal to that of a reference material. In one embodiment, the reference is phenylphosphonic acid. Thus, the at least one organic group, has a calcium index value that is greater than or equal to the calcium index value of phenyl phosphonic acid. In another embodiment, the reference is 1,2,3-benzene tricarboxylic acid. In one embodiment, the calcium index value is greater than or equal to 2.53, e.g., greater than or equal to 2.8, greater than or equal to 3.0, or greater than or equal to 3.2, as determined using UV-Vis spectroscopy (or method A), as described in more detail below.

Method A.

For this method, a series of solutions were prepared at pH 9 that contained 0.087 mM Congo Red indicator, 5 mM cesium chloride, 1 wt % MW350 polyethylene glycol methyl ether, and calcium chloride in concentrations ranging from 0 to 7 mM (0.2, 0.5, 1, 2, 3, 4, 4.5, 5, 6, and 7 mM). The UV-Vis spectra of these solutions were recorded within 1 hour of their preparation using a UV-2501PC. These spectra were used to create a calibration curve relating the absorbance at 520 nm to the calcium concentration.

Test solutions were then prepared at pH 9 that contained 0.087 mM Congo Red indicator, 1 wt % MW350 polyethylene glycol methyl ether, 5 mM calcium chloride, and the cesium salt of the compound of interest such that the ion concentration at pH 9 was 5 mM. The uncomplexed calcium concentration was determined by comparison with the calibration curve. The calcium index value was then calculated as $\log_{10}((0.005-\text{uncomplexed calcium})/((\text{uncomplexed calcium})^2))$. Measurements were made in duplicate and averaged.

Method B.

For compounds that develop a high level of color and are therefore difficult to use in Method A, a second method was developed. For this method, an aqueous solution that was 0.01M in $^{43}CaCl_2$, 0.01M in NaCl, 10% $D_2O$ and at pH 8 or 9 was prepared from $^{43}CaCO_3$, HCl/$D_2O$, NaOH/$D_2O$, D2O and water. The pH was chosen to ionize the compound under investigation and to dissolve the compound. A portion of the solution weighing about 0.65 g was added to a 5 mm NMR tube and weighed to the nearest 0.001 g. The chemical shift of the unbound $^{43}Ca$ was measured using a Bruker Avance II spectrometer with a proton resonance frequency at 400.13 MHz. A 0.2-1.0M solution of the compound (ligand) under investigation was added in successive increments. After each addition, the $^{43}Ca$ chemical shift was measured, and δ, the difference between the chemical shift of the sample and that of unbound calcium was calculated. The successive increments were planned such that the $L_o/Ca_o$ ratio was 0.25, 0.5, 1, 2, 3, 4, 6 and 8 where $L_o$ is the total concentration of complexed, protonated and free anions from the ligand and $Ca_o$ is the total concentration of calcium in all species present. The calcium index value (NMR) was calculated as $\log_{10}(X)$ where X was determined by fitting the parameters X and $\delta_m$ in the equation:

$$\delta = \frac{\delta_m}{2}\left\{[1 + (L_0/Ca_0) + (1 + H^+/K_a)/(XCa_0)] - \sqrt{[1 + (L_0/Ca_0) + (1 + H^+/K_a)/(XCa_0)]^2 - 4(L_0/Ca_0)}\right\}$$

so that the RMS difference between the data and the predicted chemical shifts from the equation are minimized where:

$\delta$ is the difference in the $^{43}Ca$ chemical shift of the sample vs that of free aqueous $^{43}Ca^{2+}$;

$\delta_m$ is the calculated difference in the $^{43}Ca$ chemical shift at infinite L/Ca vs that of free $^{43}Ca^{2+}$;

$L_o$ is the total concentration of complexed, protonated and free anions from the ligand;

$Ca_o$ is the total concentration of calcium in all species present;

X is a fitting parameter; and $K_a$ is the proton dissociation constant for the ligand LH.

Without wishing to be bound by any theory, the presently claimed polymer dispersant can lead to improved printing performance as a result of an interaction or binding with calcium salts and/or other divalent metal salts (e.g., magnesium) present in or on the substrate. The divalent metal salts can be a coating on the substrate or subsequently added, such as by printing with a fixer fluid containing metal salts. The initially stable dispersions can rapidly destabilize when in contact with a substrate. Alternatively, or in addition, destabilization may result from a change in pH on contact with the substrate, which may be advantageous for polymer dispersants comprising the attached functional groups described above. It is believed that the rapid destabilization after printing, caused either by a change in pH, interaction with calcium and/or other divalent metal salts, or mixtures thereof, results in printed images with good overall properties, such as optical density, edge acuity, and/or intercolor bleed.

In one embodiment, the portion of the second monomers functionalized with the at least one organic group is expressed as mol % of the total amount of second monomers (sum of functionalized and nonfunctionalized second monomers). In one embodiment, the portion of the second monomers functionalized with the at least one organic group is at least 3 mol %, e.g., at least 5 mol %, at least 7 mol %, or at least 10 mol % relative to the total amount of second monomers. In one embodiment, the portion of the second monomers functionalized with the at least one organic group is at most 75 mol % of the total second monomers, e.g., at most 60 mol %, at most 50 mol %, or at most 40 mol % of the total amount of second monomers. In one embodiment, the portion of the second monomers functionalized with the at least one organic group ranges from 3 mol % to 75 mol %, e.g., from 5 mol % to 75 mol %, from 3 mol % to 60 mol %, from 5 mol % to 60 mol %, from 3 mol % to 50 mol %, from 5 mol % to 50 mol %, from 3 mol % to 40 mol %, or from 5 mol % to 40 mol % of the total amount of second monomers.

In one embodiment, a portion of the second monomers are functionalized with the at least one organic group via a number of reactions known in the art, e.g., reactions with carboxylic acids and/or anhydrides. In one embodiment, alcohols or amines containing the at least one organic group can react with the maleic anhydride or acid, optionally in the presence of a base where needed. In one embodiment, a primary amine containing the at least one organic group can react with the maleic anhydride or acid in the presence of a base to form an amide group that bonds the at least one organic group to the polymer.

In one embodiment, the at least one organic group comprises at least one group selected from carboxylic acids, sulfonic acids, phosphonic acids, hydroxyls, amines, and esters, amides, and salts, and esters thereof.

In one embodiment, the at least one organic group is selected from one or more of:

at least one phosphonic acid group (e.g., at least two phosphonic acid groups), partial esters thereof, and salts thereof, such as a germinal bisphosphonic acid group, partial esters thereof, and salts thereof;

at least one heterocyclic group comprising at least one OH group (e.g., at least two OH groups) and salts thereof;

at least one phosphonic acid group or a salt thereof and at least one second ionic, ionizable, or basic group vicinal or geminal to the phosphonic acid group, and salts thereof;

an aryl or alkyl polyacid group comprising at least three carboxylic acids;

a heteroaryl group comprising at least one carboxylic acid group, and salts thereof;

an aryl group comprising at least one nitroso group and at least one OH group, and salts thereof; and an azoarene group comprising at least one OH group, at least one $NH_2$ group, or at least one OH group and at least one $NH_2$ group and has the formula $Ar^1$—N=N—$Ar^2$, wherein $Ar^1$ and $Ar^2$, which can be the same or different, are an arylene group or an aryl group and at least one of $Ar^1$ or $Ar^2$ is an arylene group.

In one embodiment, the at least one organic group comprises at least two phosphonic acid groups, esters thereof, or salts thereof.

In one embodiment, the at least one organic group may comprise at least one geminal bisphosphonic acid group, partial esters thereof, and salts thereof, that is, the at least one organic group may comprise at least two phosphonic acid groups, partial esters thereof, and salts thereof that are directly bonded to the same carbon atom. Such a group may also be referred to as a 1,1-diphosphonic acid group, partial ester thereof, or salt thereof. Thus, for example, the at least one organic group may comprise a group comprising the formula —$CQ(PO_3H_2)_2$, partial esters thereof, and salts thereof. Q is bonded to the geminal position and may be H, R, OR, SR, or $NR_2$ wherein R, which can be the same or different, is H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. For example, Q may be H, R, OR, SR, or $NR_2$, wherein R, which can be the same or different, is H, a $C_1$-$C_6$ alkyl group, or an aryl group. In one embodiment, Q is H, OH, or $NH_2$. Furthermore, the at least one organic group may comprise a group comprising the formula —$(CH_2)_n$—$CQ(PO_3H_2)_2$, partial esters thereof, and salts thereof, wherein Q is as described above and n is 0 to 9, such as 1 to 9, 0 to 3, or 1 to 3. In one embodiment, n is either 0 or 1. Also, the at least one organic group may comprise a group comprising the formula —Y—$(CH_2)_n$—$CQ(PO_3H_2)_2$, partial esters thereof, and salts thereof, wherein Q and n are as described above and Y is an arylene, heteroarylene, alkylene, vinylidene, alkarylene, aralkylene, cyclic, or heterocyclic group. In one embodiment, Y is an arylene group, such as a phenylene, naphthalene, or biphenylene group, which may be further substituted with any group, such as one or more alkyl groups or aryl groups. When Y is an alkylene group, examples include, but are not limited to, substituted or unsubstituted alkylene groups, which may be branched or unbranched and can be substituted with one or more groups, such as aromatic groups. Examples include, but are not limited to, $C_1$-$C_{12}$ groups like methylene, ethylene, propylene, or butylene, groups.

Y may be further substituted with one or more groups selected from, but not limited to, R', OR', COR', COOR', OCOR', carboxylates, halogens, CN, NR'$_2$, SO$_3$H, sulfonates, sulfates, NR'(COR'), CONR'$_2$, imides, NO$_2$, phosphates, phosphonates, N=NR', SOR', NR'SO$_2$R', and SO$_2$NR$_2$', wherein R' which can be the same or different, is independently hydrogen, branched or unbranched $C_1$-$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

In one embodiment, the at least one organic group may comprise a group comprising the formula —Y-Sp-(CH$_2$)$_n$—CQ(PO$_3$H$_2$)$_2$, partial esters thereof, or salt thereof, wherein Y, Q and n are as described above. Sp is a spacer group, which, as used herein, is a link between two groups. Sp can be a bond or a chemical group. Examples of chemical groups include, but are not limited to, —CO$_2$—, —O$_2$C—, —CO—, —OSO$_2$—, —SO—, —SO$_2$—, —SO$_2$C$_2$H$_4$O—, —SO$_2$C$_2$H$_4$S—, —SO$_2$C$_2$H$_4$NR"—, —O—, —S—, —NR"—, —NR"CO—, —CONR"—, —NR"CO$_2$—, —O$_2$CNR"—, —NR"CONR"—, —N(COR")CO—, —CON(COR")—, —NR"COCH(CH$_2$CO$_2$R")— and cyclic imides therefrom, —NR"COCH$_2$CH(CO$_2$R")— and cyclic imides therefrom, —CH(CH$_2$CO$_2$R")CONR"— and cyclic imides therefrom, —CH(CO$_2$R")CH$_2$CONR" and cyclic imides therefrom (including phthalimide and maleimides of these), sulfonamide groups (including —SO$_2$NR"— and —NR"SO$_2$— groups), arylene groups, alkylene groups and the like. R", which can be the same or different, represents hydrogen or an organic group such as a substituted or unsubstituted aryl or alkyl group. As shown by the structure above, a group comprising at least two phosphonic acid groups and salts thereof is bonded to Y through the spacer group Sp. In one embodiment, Sp is —CO$_2$—, —O$_2$C—, —O—, —NR"CO—, or —CONR"—, —SO$_2$NR"—, —SO$_2$CH$_2$CH$_2$NR"—, —SO$_2$CH$_2$CH$_2$O—, or —SO$_2$CH$_2$CH$_2$S—, wherein R" is H or a $C_1$-$C_6$ alkyl group.

In addition, the at least one organic group may comprise at least one group comprising the formula —CR=C(PO$_3$H$_2$)$_2$, partial esters thereof, and salts thereof. R can be H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. In one embodiment, R is H, a $C_1$-$C_6$ alkyl group, or an aryl group.

In one embodiment, the at least one organic group may comprise more than two phosphonic acid groups, partial esters thereof, and salts thereof and may, for example comprise more than one type of group (such as two or more) in which each type of group comprises at least two phosphonic acid groups, partial esters thereof, and salts thereof. For example, the at least one organic group may comprise a group comprising the formula —Y—[CQ(PO$_3$H$_2$)$_2$]$_p$, partial esters thereof, or salt thereof. Y and Q are as described above. In one embodiment, Y is an arylene, heteroarylene, alkylene, alkarylene, or aralkylene group. In this formula, p is 1 to 4, e.g., p is 2.

In one embodiment, the at least one organic group may comprise at least one vicinal bisphosphonic acid group, partial ester thereof, and salts thereof, meaning that these groups are adjacent to each other. Thus, the at least one organic group may comprise two phosphonic acid groups, partial esters thereof, and salts thereof bonded to adjacent or neighboring carbon atoms. Such groups are also sometimes referred to as 1,2-diphosphonic acid groups, partial esters thereof, and salts thereof. The group comprising the two phosphonic acid groups, partial esters thereof, and salts thereof may be an aromatic group or an alkyl group, and therefore the vicinal bisphosphonic acid group may be a vicinal alkyl or a vicinal aryl diphosphonic acid group, partial ester thereof, and salts thereof. For example, the at least one organic group may be a group comprising the formula —C$_6$H$_3$—(PO$_3$H$_2$)$_2$, partial esters thereof, and salts thereof, wherein the acid, ester, or salt groups are in positions ortho to each other.

In one embodiment, the at least one organic group comprises at least one phosphonic acid group or a salt thereof and at least one second ionic, ionizable, or basic group vicinal or geminal to the phosphonic acid group, and salts thereof.

In one embodiment, the at least one organic group is selected from —C(OH)(PO$_3$H$_2$)$_2$, —CH$_2$C(OH)(PO$_3$H$_2$)$_2$, —CH$_2$CH$_2$C(OH)(PO$_3$H$_2$)$_2$, —CH$_2$CH$_2$CH$_2$C(OH)(PO$_3$H$_2$)$_2$, —CH(PO$_3$H$_2$)$_2$, —CH$_2$CH(PO$_3$H$_2$)$_2$, partial esters thereof, and salts thereof.

In one embodiment, the at least one organic group comprises at least one heterocyclic group (e.g., a heteroaryl group) comprising at least one OH group, e.g., at least two OH groups, and salts thereof. The heterocyclic group can be a nitrogen-containing heteroaryl group, such as a pyridinyl group or a quinolinyl group, and the at least one organic group is a hydroxy pyridinyl group or a hydroxy quinolinyl group. The hydroxy group can be positioned on the heteroaryl group such that it is geometrically close to the heteroatom, such as ortho to the heteroatom. Such a group may be in the salt form. For example, the at least one organic group may comprise a 2-hydroxy pyridinyl group or a 2-hydroxy-quinolinyl group, as well as an 8-hydroxy-quinolinyl group and salts thereof. Other isomers or tautomers will also be known to one skilled in the art. In one embodiment, the at least one organic group comprises an 8-hydroxy-quinolinyl group. In addition, the at least one organic group may further comprise additional organic groups, including those described above for Y. For example, electron withdrawing groups, such as chloro or nitro groups, may be included in order to lower the pKa of the OH group. In one embodiment, the organic group may comprise at least one heterocyclic group (e.g., a heteroaryl group) comprising at least one OH group, and salts thereof.

In one embodiment, the at least one organic group may also comprise at least one heteroaryl group comprising at least two OH groups. When there are two OH groups, the OH groups can be in positions ortho to each other on the heteroaryl group. When there are more than two OH groups, at least two of the OH groups are in positions ortho to each other on the heteroaryl group. For example, the at least one organic group may be a dihydroxy-pyridinyl group, such as a 2,3-dihydroxy-pyridinyl group (which can also be referred to as a 3-hydroxy-2-pyridonyl group), a 3,4-dihydroxy-pyridinyl group (which can also be referred to as a 3-hydroxy-4-pyridonyl group), a 2,3-dihydroxy-quinolinyl group (which can also be referred to as 3-hydroxy-2-quinolonyl group), or a 3,4-dihydroxy-quinolinyl group (which can also be referred to as a 3-hydroxy-4 quinolonyl group). Other isomers and tautomers will also be known to one skilled in the art.

In one embodiment, the at least one organic group comprises at least one phosphonic acid group, a partial ester thereof, and salts thereof and at least one second ionic, ionizable group, or basic group. The second group is not a phosphonic acid group or salt thereof. In one embodiment, the second ionic or ionizable group is a carboxylic acid group, a sulfonic acid group, or a salt thereof. In one embodiment, the basic group is a Lewis base, such as an OH group (a hydroxyl group) or an amino group. In one embodiment, these two groups are geminal to each other, by which is meant, are directly bonded to the same carbon atom. Thus, for example, when the second ionic or ionizable group is a carboxylic acid group or salt thereof, the at least one organic group may comprise a group comprising the formula —CQ$(PO_3H_2)(CO_2H)$ and salts thereof. Q, which is bonded to the geminal position, may be any of those described above. In one embodiment, Q is H. In addition, the at least one organic group may comprise a group comprising the formula —$(CH_2)_n$—CQ$(PO_3H_2)(CO_2H)$ and salts thereof, wherein n is 0 to 9, e.g., 0 to 3. Furthermore, the at least one organic group may comprise a group comprising the formula —Y—$(CH_2)_n$—CQ$(PO_3H_2)(CO_2H)$ or salt thereof, wherein Y is as described above. In one embodiment, Y is an arylene group. Also, the at least one organic group may comprise a group comprising the formula —Y-Sp-$(CH_2)_n$—CQ$(PO_3H_2)(CO_2H)$ or salt thereof, wherein Y and Sp, which is a spacer group, are as described above. In one embodiment, Y is an arylene group.

In one embodiment, the at least one organic group may comprise at least one phosphonic acid group, a partial ester thereof, and salts thereof and at least one hydroxy group or salt thereof, such as a group comprising the formula —Y—$(PO_3H_2)(OH)$ and salts thereof, wherein Y is as described above. In one embodiment, Y is an arylene group and the phosphonic acid group and hydroxy group are in positions ortho to each other. When these groups are geminal, the at least one organic group may comprise at least one group comprising the formula —CR$(PO_3H_2)(OH)$ and/or salts thereof, wherein R is H or a $C_1$-$C_6$ alkyl group. In one embodiment, R is H. Also, the at least one organic group may comprise at least one group comprising the formula —$(CH_2)_n$—CR$(PO_3H_2)(OH)$ and salts thereof, wherein n is 0 to 9, e.g., 0 to 3. Furthermore, the at least one organic group may comprise a group comprising the formulas —Y—$(CH_2)_n$—CR$(PO_3H_2)(OH)$ and salts thereof or —Y-Sp-$(CH_2)_n$—CR$(PO_3H_2)(OH)$ and salts thereof, wherein Y and Sp are as described above.

In one embodiment, the at least one organic group comprises an aryl or alkyl polyacid group comprising at least three carboxylic acids. In one embodiment, at least two of the carboxylic acid groups are vicinal, meaning that they are bonded to adjacent atoms (e.g., adjacent carbon atoms). For example, the at least one organic group is an aryl polyacid group comprising at least three carboxylic acids, such as 1,2,3- or 1,2,4-tricarboyxlic acid, a 1,2,3,4- or 1,2,4,5-tetra carboxylic acid group.

In one embodiment, the at least one organic group comprises a heteroaryl group comprising at least one carboxylic acid group or salt thereof. The heteroaryl group may be any of those known in the art. In one embodiment, the heteroaryl group is a nitrogen containing heteroaryl group, such as a pyridinyl group, a pyrimidinyl group, a pyrrolyl group, a quinolinyl group, or a pyrazinyl group. In one embodiment, the at least one organic group comprises two carboxylic acid groups and salts thereof. These acid groups may be anywhere on the heteroaryl ring. In one embodiment, the acid groups can be either ortho or meta to each other. Furthermore, when the heteroaryl group contains at least one nitrogen atom, the two acid groups can be both adjacent to (that is, ortho to) the nitrogen atom. Thus, for example, the heteroaryl group may be a 2,6-pyridinyl-dicarboxylic acid group.

In one embodiment, the at least one organic group comprises an aryl group comprising at least one nitroso group and at least one OH group, or a salt thereof. The two groups may be located anywhere on the aryl group. In one embodiment, the aryl group is a phenyl group and the nitroso and OH groups are in positions ortho to each other. The aryl group may further comprise other substituents, such as alkyl groups, halogen groups, ether groups and the like, including electron withdrawing groups, such as chloro and nitro groups, capable of lowering the pKa of the at least one organic group, regardless of which tautomeric form it is in. For example, the at least one organic group can be a nitrosophenolic group, such as a group comprising the formula —$C_6H_3(OH)(NO)$ or a group comprising the formula —$C_6H_2Z(OH)(NO)$, wherein Z is an electron withdrawing group such as chloro or nitro.

In one embodiment, the at least one organic group comprises an azoarene group. For example, the at least one organic group may comprise a group comprising the formula $Ar^1$—N=N—$Ar^2$, wherein $Ar^1$ and $Ar^2$, which can be the same or different, are an arylene group, such as a phenylene or a naphthylene group, or an aryl group, such as a phenyl group or a naphthyl group, and at least one of $Ar^1$ or $Ar^2$ is an arylene group. For this embodiment, the azoarene group has at least one or at least two OH groups, at least one or at least two $NH_2$ groups, or at least one OH group and at least one $NH_2$ group. Thus, for example, the azoarene group may have the formula —(HO)$Ar^1$—N=N—$Ar^2$(OH) (a bishydroxy azoarene group), —($H_2$N)$Ar^1$—N=N—$Ar^2$($NH_2$) (a bis-amino azoarene group), or —(HO)$Ar^1$—N=N—$Ar^2$($NH_2$) or —($H_2$N)$Ar^1$—N=N—$Ar^2$(OH) (an amino-hydroxy azoarene group). Other combinations may also be possible. In one embodiment, the OH and/or $NH_2$ groups are located at positions ortho to the azo group (the N=N group). For example, the at least one organic group may be a group comprising the structure —(HO)$C_6H_3$—N=N—$C_6H_3$(OH). Also, electron withdrawing groups, such as chloro or nitro groups, may be included on the aryl and/or arylene groups. For example, the at least one organic group is a group comprising the structure —(HO)$C_6H_3$—N=N—$C_6H_3$Z(OH), wherein Z is an electron withdrawing group such as chloro or nitro.

In one embodiment, at least a portion of the second monomers are functionalized with at least one organic group (or at least a second portion of the second monomers functionalized with at least one second organic group, for polymers containing at least one organic group having the desired calcium index values) comprising the formula -A-N($R^3$)($R^4$), wherein $R^3$ and $R^4$ are independently selected from H, $C_1$-$C_{10}$ alkyl, $C_4$-$C_{18}$ aryl, $C_4$-$C_{18}$ heteroaryl, and $C_3$-$C_{20}$ heterocycloalkyl, and A is selected from $C_1$-$C_{10}$ alkylene, $C_3$-$C_{20}$ cycloalkylene, $C_3$-$C_{20}$ heterocycloalkylene (wherein at least one ring atom of the cycloalkylene is a heteroatom selected from O, N, and S), arylene, heteroarylene (wherein at least one ring atom of the heteroarylene is a heteroatom selected from O, N, and S), and $C_2$-$C_{20}$ ether. In another embodiment, at least a portion of the second monomers are functionalized with at least one organic group (or at least a second portion of the second monomers functionalized with at least one second organic group, for polymers containing at least one organic group having the desired calcium index values) comprising the formula selected from —CH$_2$CH$_2$—N(CH$_3$)$_2$, —CH$_2$CH$_2$CH$_2$—N(CH$_3$)$_2$, —CH(CH$_3$)CH$_2$—N(CH$_3$)$_2$, —CH$_2$CH$_2$CH$_2$CH$_2$—N(CH$_3$)$_2$, —CH$_2$CH$_2$—N(CH$_2$CH$_3$)$_2$, —CH$_2$CH$_2$CH$_2$—N(CH$_2$CH$_3$)$_2$, —CH$_2$CH$_2$CH$_2$CH$_2$—N(CH$_2$CH$_3$)$_2$, —CH$_2$CH$_2$—NHCH$_2$CH$_2$OH, —CH$_2$CH$_2$—N(CH$_2$CH$_2$OH)$_2$, and

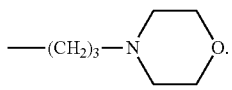

In yet another embodiment, at least a second portion of the second monomers are functionalized with at least one organic group (or at least a second portion of the second monomers functionalized with at least one second organic group, for polymers containing at least one organic group having the desired calcium index values) comprising the formula -A-N$^+$(R$^3$)(R$^4$)(R$^5$), wherein R$^3$, R$^4$, and R$^5$ are independently selected from H, C$_1$-C$_{10}$ alkyl, C$_4$-C$_{18}$ aryl, C$_4$-C$_{18}$ heteroaryl, and C$_3$-C$_{20}$ heterocycloalkyl, and A is selected from C$_1$-C$_{10}$ alkylene, C$_3$-C$_{20}$ cycloalkylene, C$_3$-C$_{20}$ heterocycloalkylene, arylene, heteroarylene, and C$_2$-C$_{20}$ ether. In any of these embodiments, the at least one organic group is bonded to that portion of the second monomers via amide, imide, and ester linkages, e.g., via amide linkages and ester linkages.

In one embodiment, the at least one polymer can act as a polymer dispersant to disperse a pigment in a liquid medium (e.g., an aqueous medium). The dispersing can be performed with methods known in the art, e.g., mixing (e.g., with high shear mixer), sonication, milling (e.g., with media or ball mill), etc. In one embodiment, crosslinking is performed by adding crosslinking agents to the polymer-dispersed pigment.

In one embodiment, the composition comprises a pigment that is a polymer-dispersed pigment comprising the at least one polymer adsorbed to or encapsulating the pigment (e.g., a polymer-encapsulated pigment). In another embodiment, the at least one polymer is crosslinked via the second monomers. For example, polymer-encapsulated pigments can comprise polymer-dispersed pigments in which the at least one polymer is crosslinked with various crosslinking agents. The pigment can be any pigment described herein, e.g., a non-modified, or otherwise untreated pigment, or a modified (self-dispersed) pigment.

In one embodiment, the at least one polymer is cross-linked via at least one linkage selected from amide, imide, ester, ether, and thioether linkages (e.g., amide, ester, and ether linkages, or amide and ester linkages). For example, crosslinking agents such as multifunctional reagents (e.g., difunctional, trifunctional, etc.) containing two or more epoxy, thiol, and amine groups, and mixtures thereof can be used to form linkages, e.g., in reaction with carboxylate-containing groups of the second monomers. In one embodiment, the second monomers (e.g., comprising maleic anhydride, maleic acid, and salts, esters, imides, and amides thereof, etc.) of at least two different polymers can react with the crosslinking agents. In one embodiment, the cross-linking agents are selected from epoxy-containing compounds, e.g., di- or tri-epoxy-based compounds, such as trimethylolpropane polyglycidyl ether, e.g., to form cross-linked polymers comprising ester linkages. In one embodiment, the ester linkage is derived from a reaction between an epoxy-containing compounds (e.g., di- and tri-glycidyl ether compounds such as trimethylolpropane polyglycidyl ether) and carboxylate-containing groups of the second monomers. In another embodiment, the cross-linking agent is selected from aminoethanethiol.

In one embodiment, the at least one polymer is cross-linked through carboxylate-containing groups of the second monomer, e.g., anhydrides, carboxylic acids and salts, esters, imides, and amides thereof, or carboxylic acids and salts thereof. In one embodiment, the at least one polymer, if containing anhydrides, carboxylic acids and salts, esters, imides, and amides thereof, can be hydrolyzed to generate carboxylate-containing groups (e.g., carboxylic acid or carboxylate), which can be reacted with the crosslinking agent. Hydrolysis can be performed to generate the carboxylic acid or carboxylate either prior to concurrent with addition of the crosslinking agent.

In another embodiment, the at least the at least one polymer is crosslinked through at least 10% of the carboxylate-containing groups of the second monomer, e.g., 10% to 50%, 10% to 40%, or 10% to 30% of the carboxylate-containing groups of the second monomer. In one embodiment, the number of carboxylate-containing groups targeted for crosslinking ("% CO$_2$ targeted") can be determined by the amount of crosslinking agent added.

In one embodiment, the at least one polymer, which is crosslinked, has an acid number ("AN(xlink)") of less than 325. In one embodiment, the acid number of the at least one polymer is defined as a theoretical value in relation to the acid number of the starting polymer ("AN(SP)") and the percentage of carboxylate-containing targeted for crosslinking ("% CO$_2$ targeted") according to the following equation:

$$AN(xlink)=AN(SP)-(\% \; CO_2 \; targeted) \times AN(SP)$$

In one embodiment, the at least one polymer has an acid number AN(xlink) less than 300, less than 275, less than 250, or less than 200. In another embodiment, the at least one polymer AN(xlink) has an acid number ranging from 50 to 325, e.g., an acid number ranging from 50 to 300, from 50 to 275, from 50 to 250, from 50 to 225, from 50 to 200, from 75 to 325, from 75 to 300, from 75 to 275, from 75 to 250, from 75 to 225, from 75 to 200, from 90 to 325, from 90 to 300, from 90 to 275, from 90 to 250, from 90 to 225, or from 90 to 200.

In one embodiment, the at least one polymer is present in the composition in an amount ranging from 0.1% to 25% by weight, e.g., from 0.1% to 20% by weight, from 0.2% to 25% by weight, from 0.2% to 20% by weight, from 0.5% to 25% by weight, or from 0.5% to 20% by weight relative to the total weight of the inkjet ink composition.

In one embodiment, the at least one polymer has a weight average molecular weight (M$_w$) of at least 1000, e.g., at least 2000 or at least 3000 (for the uncrosslinked polymer). In another embodiment, the M$_w$ is less than or equal to 200,000, e.g., less than 150,000, less than 100,000, or less than 70,000. In one embodiment, the M$_w$ ranges from 1000 to 200,000, e.g., from 1000 to 150,000, from 1000 to 100,000, from 1,000 to 70,000, from 2000 to 200,000, from 2000 to 150,000, from 2000 to 100,000, from 2000 to 70,000, from 3000 to 200,000, from 3000 to 150,000, from 3000 to 100,000, or from 3000 to 70,000.

In one embodiment, the composition comprising the at least one polymer (e.g., the at least one polymer crosslinked via the second monomers) has a pH ranging from 8 to 11, e.g., a pH ranging from 8.5 to 11, from 8 to 10.5, from 8.5 to 10.5, from 8 to 10, or from 8.5 to 10. In one embodiment, the composition is a dispersion (such as an aqueous dispersion) comprising, consisting essentially of, or consisting of the at least one polymer, at least one pigment, and a liquid vehicle (e.g., an aqueous solution or water).

Another embodiment provides a method of making a polymer (e.g., a polymer capable of binding a divalent metal ion, such as a calcium and/or magnesium binding polymer) comprising:
(a) combining:
(i) at least one polymer comprising first monomers selected from ethylenically unsaturated hydrophobic monomers, and second monomers selected from maleic anhydride, maleic acid, and salts, esters, imides, and amides thereof, and
(ii) at least one reagent comprising an amino group and at least one organic group having a calcium index value greater than a calcium index value of phenylphosphonic acid; and
(b) forming the polymer.

In one embodiment, the combining is performed in the presence of at least one base selected from $NH_4OH$, NaOH, and KOH. In one embodiment, the at least one reagent comprises an amino group selected from a primary amine.

Another embodiment provides a method of making a polymer comprising,
(a) combining:
(i) at least one polymer comprising first monomers selected from ethylenically unsaturated hydrophobic monomers, and second monomers selected from maleic anhydride, maleic acid, and salts, esters, imides, and amides thereof, wherein the ethylenically unsaturated hydrophobic monomers comprise the formula $CH_2{=}CR^1R^2$, where $R^1$ and $R^2$ are independently selected from H, $C_1$-$C_{12}$ alkyl, $C_5$-$C_{20}$ aryl, and $C_6$-$C_{20}$ alkaryl, and the carbon atoms of $R^1$ and $R^2$ can be optionally substituted with at least one heteroatom selected from O, N, and S, and
(ii) at least one crosslinking agent selected from epoxy-containing compounds; and
(b) forming the polymer.

In one embodiment, any of the methods described herein further comprises combining the polymer with at least one crosslinking agent, e.g., selected from epoxy-containing compounds such as the di- or tri-epoxy-based compounds disclosed herein, e.g., trimethylolpropane triglycidyl ether. In one embodiment, the method comprises combining the polymer with the at least one crosslinking agent and boric acid. In one embodiment, the at least one crosslinking agent selected from epoxy-containing compounds reacts with carboxylate-containing groups of the second monomers.

In one embodiment, wherein prior to or simultaneous with the combining the at least one polymer with at least one crosslinking agent, the method further comprises hydrolyzing the at least one polymer. Hydrolysis can be performed by any method known in the art, e.g., by the addition of water and/or at least one base, e.g., at least one base selected from $NH_4OH$, NaOH, and KOH. In one embodiment, hydrolysis generates carboxylate-containing groups (e.g., carboxylic acid or carboxylate groups) of the second monomers that can react with the at least one crosslinking agent. In one embodiment, upon forming the crosslinked polymer, the composition (e.g., solution containing the polymer) has a pH ranging from 8 to 11, e.g., a pH ranging from 8.5 to 11 or from 8.5 to 10.5.

Pigments

In one embodiment, the inkjet ink composition comprises at least one pigment, which can be unmodified or modified. The pigments are solid materials generally in the form of a particulate or in a form readily formed into a particulate, such as a pressed cake. In one embodiment, the modified pigment has attached at least one moiety, e.g., acid groups (and partial salts, partial esters, salts, and esters thereof), and organic groups. In another embodiment, the modified pigment is an oxidized pigment, which can further comprise attached moieties. In one embodiment, the modified pigment is self-dispersible such that an external dispersant is not required for dispersing the pigment (self-dispersed pigments).

In one embodiment where the pigment is unmodified, the at least one polymer can further function as a dispersant. In one embodiment where the pigment is modified, the at least one polymer can further function as an additive. In either embodiment, the polymer can improve one or more printing performance properties, such as O.D., mottle, and durability.

The unmodified pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold as Regal®, Black Pearls®, Elftex®, Monarch®, Mogul®, and Vulcan® carbon blacks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). In one embodiment, the pigment is a cyan pigment, such as Pigment Blue 15, Pigment Blue 15:3, Pigment Blue 15:4, or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or black pigment, such as carbon black.

In one embodiment, the pigment is a high structure carbon black, e.g., a carbon black having the following properties:
OAN≥170 mL/100 g; and
a ratio of STSA/BET ranging from 0.7 to 1.

In one embodiment, the ratio of STSA/BET ranges from 0.8 to 1, e.g., from 0.9 to 1. In one embodiment, the carbon black has an STSA ranging from 160 to 220 $m^2$/g. In another embodiment, the carbon black has a BET surface area of at least 150 m²/g, e.g., at least 170 m²/g, at least 190 m²/g ranging from 190 to 275 m²/g. In another embodiment, the carbon black has a compressed OAN (COAN) of at least 120 mL/100 g, e.g., a COAN of at least 130 mL/100 g. OAN and COAN can be determined according to ASTM-D2414. Surface area measurements can be determined according to ASTM-D6556. Additional details on such carbon black can be found in U.S. Pat. No. 9,388,300, the disclosure of which is incorporated herein by reference.

In one embodiment, the self-dispersed pigment is an oxidized carbon black. In one embodiment, "oxidized carbon blacks" are carbon black pigments generally having a pH<7.0 that feature surface-bound ionic or ionizable groups such as one or more of alcohols (phenols, naphthols), lactones, carbonyls, carboxyls (e.g., carboxylic acids), anhydrides, ethers, and quinones. The extent of oxidation of carbon black can determine the surface concentration of these groups. In one embodiment, the oxidized carbon black is obtained by oxidizing an unmodified carbon black, e.g., pigments selected from channel blacks, furnace blacks, gas blacks, and lamp blacks. Exemplary unmodified carbon blacks include those commercially available from Cabot Corporation as Regal®, Black Pearls®, Elftex®, Monarch®, Mogul®, and Vulcan®, such as Black Pearls® 1100, Black Pearls® 900, Black Pearls® 880, Black Pearls® 800, Black Pearls® 700, Black Pearls® 570, Elftex® 8, Monarch® 900, Monarch® 880, Monarch® 800, Monarch® 700, Regal® 660, and Regal® 330. Exemplary oxidizing agents for carbon blacks include oxygen gas, ozone, peroxides such as hydrogen peroxide, persulfates such as sodium and potassium persulfate, hypohalites such as sodium hypochlorite, nitric acid, and transition metal-containing oxidants such as permanganate salts, osmium tetroxide, chromium oxides, ceric ammonium nitrates, and mixtures thereof (e.g., mixtures of gaseous oxidants such as oxygen and ozone).

In another embodiment, the oxidized carbon black is obtained from commercial sources, such as Black Pearls® 1400, Black Pearls® 1300, Black Pearls® 1000, Black Pearls® L, Monarch® 1000, Mogul® L, and Regal® 400, available commercially from Cabot Corporation.

In one embodiment, the pigment has attached at least one organic group where an "attached" organic group can be distinguished from an adsorbed group in that a soxhlet extraction for several hours (e.g., at least 4, 6, 8, 12, or 24 hours) will not remove the attached group from the pigment. In another embodiment, the organic group is attached to the pigment if the organic group cannot be removed after repeated washing with a solvent or solvent mixture that can dissolve the starting organic treating material but cannot disperse the treated pigment. In yet another embodiment, "attached" refers to a bond such as a covalent bond, e.g., a pigment bonded or covalently bonded to a nucleophile or organic group.

In one embodiment, the at least one organic group may be an aliphatic group, a cyclic organic group, or an organic compound having an aliphatic portion and a cyclic portion, e.g., arylene, heteroarylene, and alkylene. In one embodiment, the organic group is attached via a diazonium salt derived from a primary amine capable of forming, even transiently, a diazonium salt. Other methods of attachment are described below. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl), and heteroaryl groups (imidazolyl, pyrazolyl, pyridinyl, thienyl, thiazolyl, furyl, indolyl, and triazolyl, such as 1,2,4-triazolyl and 1,2,3-triazolyl).

The arylene, heteroarylene, and alkylene can be unsubstituted or substituted. Exemplary arylenes include phenylene, naphthylene, and biphenylene, and exemplary heteroarylenes include phenylene, naphthylene, and biphenylene having a ring carbon substituted with one or more oxygen or nitrogen atoms. In one embodiment, the arylene is a $C_5$-$C_{20}$ arylene. Heteroarylenes can be an arylene as defined herein which one or more ring carbon atoms is replaced with a heteroatom, e.g., N, O, and S. The heteroatom can be bonded to other groups in addition to being a ring atom. Alkylenes may be branched or unbranched. The alkylene may be a $C_1$-$C_{12}$ alkylene such as methylene, ethylene, propylene, or butylene.

In one embodiment, the at least one attached organic group comprises at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{2-}$, $R'SO_3^-$, $R'OSO_3^-$, $OH^-$, or $Cl^-$, where R' represents hydrogen or an organic group, such as a substituted or unsubstituted aryl or alkyl group. An ionizable group is one that is capable of forming an ionic group in the medium of use. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include —COO; —$SO_3^-$, —$OSO_3^-$, —$HPO_3^-$; —$OPO_3^{2-}$, or —$PO_3^{2-}$, and specific examples of an anionizable group can include —COOH, —$SO_3H$, —$PO_3H_2$, —R'SH, or —R'OH, where R' represents hydrogen or an organic group, such as a substituted or unsubstituted aryl or alkyl group. Also, specific examples of cationic or cationizable groups include alkyl or aryl amines, which can be protonated in acidic media to form ammonium groups —$NR'_2H^+$, where R' represent an organic group, such as a substituted or unsubstituted aryl or alkyl groups. Organic ionic groups include those described in U.S. Pat. No. 5,698,016, the disclosure of which is incorporated herein by reference.

For example, the attached group may be an organic group such as a benzene carboxylic acid group (—$C_6H_4$—COOH group), a benzene dicarboxylic acid group, a benzene tricarboxylic acid group, a benzene sulfonic acid group (a —$C_6H_4$—$SO_3H$ group), or salts thereof. In one embodiment, surface modification to introduce ionic or ionizable groups onto a pigment surface, such as chlorination and sulfonylation, may also be used.

In one embodiment, the at least one organic group attached to the pigment is capable of binding calcium (e.g., having defined calcium index values), including those organic groups described in PCT Pub. No. WO 2007/053564, the disclosure of which is incorporated herein by reference, the groups capable of binding calcium as described herein. For example, the organic group comprises at least one geminal bisphosphonic acid group, partial esters thereof, or salts thereof, e.g., a group having the formula —$CQ(PO_3H_2)_2$, partial esters thereof, or salts thereof, wherein Q is bonded to the geminal position and may be H, R, OR, SR, or NR$_2$ wherein R", which can be the same or different, is defined as above, or can be H, a C$_1$-C$_{18}$ saturated or unsaturated, branched or unbranched alkyl group, a C$_1$-C$_{18}$ saturated or unsaturated, branched or unbranched acyl group, an aralkyl group, an alkaryl group, or an aryl group. In addition, U.S. Pat. Nos. 5,672,198, 5,922,118, 6,042,643, and 6,641,656 disclose modified pigments having various attached groups, including phosphonic acid groups, the disclosures of which are incorporated herein by reference.

In one embodiment, the pigment (carbon black or colored pigment) is modified with at least one organic group via a diazonium treatment as detailed, for instance, in the following patents: U.S. Pat. Nos. 5,554,739; 5,630,868; 5,672,198; 5,707,432; 5,851,280; 5,885,335; 5,895,522; 5,900,029; 5,922,118; 6,042,643, 6,506,245, 6,534,569; 6,641,653, 7,223,302, 6,398,858 and 6,494,943 (high shear conditions) 6,372,820; 6,368,239; 6,350,519; 6,337,358; 6,103,380; 7,173,078; 7,056,962; 6,942,724; 6,929,889; 6,911,073; 6,478,863; 6,472,471; WO 2011/143533; and 8,858,695, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organo-halide compound in the presence of one or more particles capable of radical capture, and the like. In yet another embodiment, the pigment (carbon black or colored pigment) can be modified (e.g., to attach organic groups) by using the methods of U.S. Pat. Nos. 5,837,045, 6,660,075 and WO 2009/048564 (reaction with organic compounds containing a C=C double bond or triple bond activated by at least one substituent) or U.S. Pub. No. 2004/0171725, 6,664,312, 6,831,194 (reaction with anhydride component), 6,936,097, U.S. Pub. Nos. 2001/0036994, 2003/0101901 (reaction with organic groups having-N=N—N— group), Canadian Patent No. 2,351,162, European Patent No. 1394221, and PCT Publication Nos. WO 01/51566 (reaction between at least one electrophile and at least one nucleophile), WO 04/63289, WO 2010/141071 (reaction with H2N-A-Y where A is a heteroatom), and WO 99/23174, the disclosures of which are incorporated herein by reference.

In one embodiment, the dispersion can be formulated to provide an amount of pigment such that the final amount in the inkjet ink composition is effective to provide the desired image quality (for example, optical density) without detrimentally affecting the performance of the inkjet ink. In one embodiment, the colorant (e.g., a pigment) is present in an amount ranging from 1% to 15% by weight, e.g., from 1% to 10% by weight, relative to the total weight of the composition, e.g., an amount ranging from 2% to 10% by weight, from 3% to 10% by weight, from 2% to 7% by weight, or from 3% to 7% by weight, relative to the total weight of the composition.

Dispersions and Inkjet Ink Compositions

In one embodiment, the composition comprises a liquid vehicle. In one embodiment, the liquid vehicle is aqueous. In one embodiment, the composition comprises a pigment, resulting in a dispersion, e.g., an aqueous dispersion such as an inkjet ink composition. In one embodiment, the composition, dispersion or inkjet ink composition comprises a liquid vehicle that comprises at least 40% water (an aqueous solution), e.g., at least 45% water or at least 50% water.

In one embodiment, the composition, dispersion or inkjet ink composition comprises at least one organic solvent present in an amount ranging from 1% to 50% relative to the total weight of the inkjet ink composition, or present in other amounts as disclosed herein. The at least one organic solvent can be present in addition to at least 40% water (or at least 45% water or at least 50% water). In one embodiment, the organic solvent is soluble or miscible in water. In another embodiment, the organic solvent is chemically stable to aqueous hydrolysis conditions (e.g., reaction with water under heat aging conditions, including, for example, the hydrolysis of esters and lactones). In one embodiment, the organic solvent has a dielectric constant below that of water, such as a dielectric constant ranging from about 10 to about 78 at 20° C. Examples of suitable organic solvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly(ethylene-co-propylene) glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and ε-caprolactam); ureas or urea derivatives (such as di-(2-hydroxyethyl)-5,5,-dimethyl hydantoin (dantacol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, and dimethylsulfolane). The organic solvent can comprise mixtures of organic solvents.

The amount of the solvent can be varied depending on a variety of factors, including the properties of the solvent (solubility and/or dielectric constant), the type of colorant, and the desired performance of the resulting inkjet ink composition. The solvent may be used in amounts ranging from 1% to 40% by weight based on the total weight of the inkjet ink composition, including amounts ranging from 1% to 30%, or amounts ranging from 1% to 20%. In another embodiment, the amount of the solvent is greater than or equal to about 2% by weight based on the total weight of the aqueous dispersion or inkjet ink composition, including greater than or equal to about 5% and greater than or equal to about 10% by weight.

In one embodiment, an ink composition (e.g., an inkjet ink composition) comprises at least one surfactant, e.g., when the pigment is not self-dispersible. The at least one surfactant can enhance the colloidal stability of the composition or change the interaction of the ink with either the printing substrate, such as printing paper, or with the ink printhead. Various anionic, cationic and nonionic dispersing agents can be used in conjunction with the ink composition of the present invention, and these may be used neat or as a water solution. In one embodiment, the surfactant is present in an amount ranging from 0.05% to 5%, e.g., an amount ranging from 0.1% to 5%, or from 0.5% to 2%, by weight relative to the total weight of the inkjet ink composition.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, $\alpha$-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

In one embodiment, the inkjet ink composition comprises the polymers disclosed herein as a first polymer and further comprises a second polymer that is a polymeric dispersant, e.g., a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth) acrylic") such as poly(meth)acrylic acid, acrylic acid-(meth) acrylonitrile copolymers, potassium (meth)acrylate-(meth) acrylonitrile copolymers, vinyl acetate-(meth)acrylate ester copolymers and (meth)acrylic acid-(meth)acrylate ester copolymers; styrene-acrylic or methacrylic resins such as styrene-(meth)acrylic acid copolymers, styrene-(meth) acrylic acid-(meth)acrylate ester copolymers, styrene-$\alpha$-methylstyrene-(meth)acrylic acid copolymers, styrene-$\alpha$-methylstyrene-(meth)acrylic acid-(meth)acrylate ester copolymers; vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

In one embodiment, the inkjet ink composition has a viscosity ranging from 1-25 cP. It is understood that viscosity can be adjusted by a variety of methods. In one embodiment, polymeric binders can be used in conjunction with the inkjet ink composition disclosed herein to adjust the viscosity of the composition and/or provide other desirable properties, such as durability (e.g., at least one durability polymer). Suitable polymeric binders include, but are not limited to, water soluble polymers and copolymers such as gum arabic, polyacrylate salts, polymethacrylate salts, polyvinyl alcohols (Elvanol® polyvinyl alcohol from DuPont, Selvol™ from Sekisui Specialty Chemicals), hydroxypropylenecellulose, hydroxyethylcellulose, polyvinylpyrrolidinone (such as Luvitec® polyvinylpyrrolidinone and Kollidon® polyvinylpyrrolidinone from BASF), polyvinylether, starch, polysaccharides, polyethyleneimines with or without being derivatized with ethylene oxide and propylene oxide; the Jeffamine® polyetheramines (Huntsman); and the like. Additional examples of water-soluble polymer compounds include various dispersants or surfactants described above, including, for example, styrene-acrylic acid copolymers (such as Joncryl® resins from BASF), styrene-acrylic acid-alkyl acrylate terpolymers, styrene-methacrylic acid copolymers (such as Joncryl® resins from BASF), styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers (such as NeoCryl® resins from Koninklijke DSM N.V., the AC and AS polymers from Alberdingk-Boley) or may be a water dispersible polyurethane (such as ABU polymers from Alberdingk-Boley) or polyester (such as Eastman AQ™ polymers from Eastman Chemical). Polymers, such as those listed above, and variations and related materials that can be used for binders in inkjet inks are included in the Ethacryl® dispersants from Lyondell Chemical Company, the Joncryl® resins from BASF, the NeoCryl® resins from Koninklijke DSM N.V., and the AC and AS polymers Alberdingk-Boley.

In one embodiment, the polymeric binders are selected from polyurethanes. Exemplary polyurethanes include those that comprise at least one polyether and at least one diisocyanate. In one embodiment, the at least one polyether comprises a monomer comprising the formula (I):

$$—O—R_1—O— \qquad (I)$$

wherein $R_1$ can be substituted or unsubstituted and is selected from $C_1$-$C_{10}$ alkylene, $C_3$-$C_{20}$ cycloalkylene, $C_3$-$C_{20}$ heterocycloalkylene (at least one ring atom being a heteroatom selected from O, N, and S), $C_5$-$C_{20}$ arylene, $C_3$-$C_{20}$ heteroarylene (at least one ring atom being a heteroatom selected from O, N, and S), $C_6$-$C_{20}$ alkylarylene, a polyether moiety, and combinations thereof. In one embodiment, $R_1$ is unsubstituted. In one embodiment, $R_1$ is substituted with at least one substituent selected from $C_1$-$C_{10}$ alkyl and $C_5$-$C_{20}$ aryl groups. In one embodiment, $R_1$ is selected from a polyether moiety, e.g., polyethylene glycol moiety, a polypropylene glycol moiety, a polytetramethyleneoxide moiety, and combinations thereof. In one embodiment, the at least one polyether is formed from a diol monomer, e.g., via polymerization of diol monomers. Exemplary diol monomers include $C_1$-$C_{10}$ alkylene diols such as propylene glycol, polytetramethyleneoxide diol, 1,6-hexanediol, 1,5-pentanediol, and 2-butyl-2-ethylpropyl diol. In another embodiment, the diol monomer comprises the monomer of formula (I), e.g., the diol monomer is a $C_1$-$C_{10}$ polyalkylene glyocol, a polyether glycol, or any other diols consistent with formula (I). In one embodiment, the at least one polyether is polypropylene glycol, such as polypropylene glycols having a number average molecular weight ranging from 400 g/mol to 6000 g/mol. In one embodiment, the at least one polyether is present in an amount ranging from 30% to 95% by weight relative to the polyurethane.

In one embodiment, the at least one diisocyanate has the formula (II):

$$OCN—R_2—NCO \qquad (II)$$

wherein $R_2$ can be substituted or unsubstituted and is selected from $C_1$-$C_{10}$ alkylene, $C_3$-$C_{20}$ cycloalkylene, $C_3$-$C_{20}$ heterocycloalkylene (at least one ring atom being a heteroatom selected from O, N, and S), $C_5$-$C_{20}$ arylene, $C_3$-$C_{20}$ heteroarylene (at least one ring atom being a heteroatom selected from O, N, and S), and combinations thereof. In one embodiment, $R_2$ is unsubstituted. In one embodiment, $R_2$ is substituted with at least one substituent selected from $C_1$-$C_{10}$ alkyl and $C_5$-$C_{20}$ aryl groups. For example, $R_2$ can be hexamethylene or phenylene optionally substituted with methyl, or cyclohexylene optionally substituted with methyl

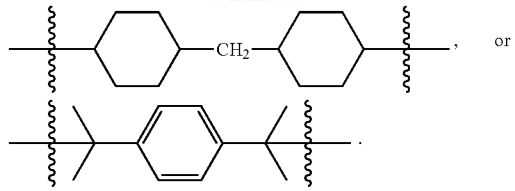

In one embodiment, the at least one diisocyanate is selected from toluene diisocyanates such as toluene 2,4-diisocyanate (2,4-TDI) and toluene 2,6-diisocyanate (2,6-TDI), hexamethylene diisocyanate (HDI), 4,4'-methylene diphenyl diisocyanate (4,4'-MDI), 2,4'-methylene diphenyl diisocyanate (2,4'-MDI), 2,2'-methylene diphenyl diisocyanate (2,2'-MDI), methylene bis(4-cyclohexyl diisocyanate) (HDMI), m-tetramethylxylene diisocyanate (m-TMXDI), and isophorone diisocyanate (IPDI). In one embodiment, the diisocyanate is selected from toluene diisocyanates (e.g., toluene 2,4-diisocyanate, toluene 2,6-diisocyanate), isophorone diisocyanate, and combinations thereof. In one embodiment, the at least one diisocyanate is present in an amount ranging from 3% to 50% by weight, relative to the polyurethane.

In one embodiment, in addition to the at least one polyether and the at least one diisocyanate, the at least one polyurethane further comprises a monomer containing at least one hydrophilic group. In one embodiment, the monomer containing at least one hydrophilic group has the formula (III):

$$—O—R_3—O— \qquad (III)$$

wherein $R_3$ comprises the at least one hydrophilic group bonded to a moiety, which can be substituted or unsubstituted, selected from $C_1$-$C_{10}$ alkylene, $C_3$-$C_{20}$ cycloalkylene, $C_3$-$C_{20}$ heterocycloalkylene (at least one ring atom being a heteroatom selected from O, N, and S), $C_5$-$C_{20}$ arylene, $C_3$-$C_{20}$ heteroarylene (at least one ring atom being a heteroatom selected from O, N, and S), $C_6$-$C_{20}$ alkylarylene. In one embodiment, a "hydrophilic group" is capable of hydrogen bonding with water. In one embodiment, the at least one hydrophilic group is selected from hydroxyls, carboxylic acids, sulfonic acids, phosphonic acids, polyethers (e.g., a polyethylene glycol, polypropylene glycol, etc.), and salts and ethers thereof. In one embodiment, the at least one hydrophilic group is selected from carboxylic acids, and salts and ethers thereof. In one embodiment, the $R_3$ moiety is unsubstituted. In another embodiment, the $R_3$ moiety is substituted with at least one substituent selected from $C_1$-$C_{10}$ alkyl and $C_5$-$C_{20}$ aryl groups. One exemplary monomers of formula (III) is dimethylolpropionic acid (DMPA).

In one embodiment, the molar ratio between the at least one diisocyanate and a polyol or diol-based monomer in the polyurethane ranges from 0.5:1 to 3:1. In another embodiment, the at least one polyurethane is characterized by an NCO/OH ratio, which is the ratio of the molar amount of isocyanate groups/molar amount of the hydroxyl groups from all diol monomers, e.g., the at least one polyether alone, or if present, the sum of the at least one polyether and the monomer containing at least one hydrophilic group. In one embodiment, the NCO/OH ratio ranges from 0.85 to 1.15, e.g., from 0.85 to 1.1, from 0.9 to 1.15, or from 0.9 to 1.1.

In one embodiment, the at least one polyurethane has an acid number corresponding to the amount of monomer containing at least one hydrophilic group, e.g., a carboxylic acid group, or any hydrophilic group disclosed herein. For example, the acid number (AN(PU)) of the at least one polyurethane can be calculated from the following equation:

$$AN(PU) = (\text{no. mol of monomer containing hydrophilic group} \times 56.1 \text{ mgKOH} \times 1000)/(\text{the total mass (g) of monomers})$$

In one embodiment, the at least one polyurethane has an acid number ranging from 10 to 100 mg KOH/g polyurethane, e.g., from 10 to 80, from 10 to 70, from 10 to 60, from 10 to 50, from 10 to 40, from 10 to 35, from 15 to 100, from 15 to 80, from 15 to 70, from 15 to 60, from 15 to 50, from 15 to 40, from 15 to 35, from 20 to 100, from 20 to 80, from 20 to 70, from 20 to 60, from 20 to 50, from 20 to 40, or ranging from 20 to 35 mg KOH/g polyurethane.

In one embodiment, the inkjet ink further comprises at least one water-soluble compound having a hydroxyl number of at least 80, wherein the at least one water-soluble compound is selected from ethoxylated $C_3$-$C_{20}$ polyols, such as ethoxylated triols, ethoxylated tetraols, ethoxylated pentaols, and ethoxylated hexaols. In one embodiment, the ethoxylated $C_3$-$C_{20}$ polyols are selected from ethyoxylated glycerol, ethoxylated pentaerythritol, ethoxylated trimethylolpropane, ethoxylated glucoside, and ethoxylated glucose. In another embodiment, the at least one water-soluble compound is selected from polyols comprising three or more hydroxyl groups (e.g., xylitol and sorbitol), and polyether polyols. The at least one water-soluble compound can be present in an amount ranging from 1% to by 60% weight, relative to the total weight of the inkjet ink composition.

Exemplary rheological additives to adjust the viscosity of an inkjet ink composition include, but are not limited to, alkali swellable emulsions (such as Rheovis® AS rheology-control additive from BASF), hydrophobically modified alkali swellable emulsions (such as Rheovis® HS rheology-control additive from BASF), hydrophobically modified polyurethanes (such as Rheovis® PU rheology-control additive from BASF), and hydrophobically modified polyethers (such as Rheovis® PE rheology-control additive from BASF).

In one embodiment, the inkjet ink compositions may further comprise dyes to modify color balance and adjust optical density. Exemplary dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts.

In one embodiment, the inkjet ink composition comprises one or more polymers selected from polymeric dispersants and polymeric binders, as disclosed herein, in an amount ranging from 0.1% to 20% by weight relative to the total weight of the composition, e.g., an amount ranging from 0.1% to 10%, from 0.1% to 5%, from 0.2% to 20%, from 0.2% to 10%, from 0.2% to 5%, from 0.5% to 20%, from 0.5% to 10%, or from 0.5% to 5% by weight relative to the total weight of the composition.

In one embodiment, in addition to the surfactant, the inkjet ink compositions can further comprise one or more suitable additives to impart a number of desired properties while maintaining the stability of the compositions. Other additives are well known in the art and include humectants, biocides and fungicides, pH control agents, drying accelerators, penetrants, and the like. The amount of a particular additive will vary depending on a variety of factors but are generally present in an amount ranging between 0.01% and 40% based on the weight of the inkjet ink composition. In one embodiment, the at least one additive is present in an amount ranging from 0.05% to 5%, e.g., an amount ranging from 0.1% to 5%, or an amount ranging from 0.5% to 2%, by weight relative to the total weight of the inkjet ink composition Humectants and water soluble organic compounds other than the at least one organic solvent may also be added to the inkjet ink composition of the present invention, e.g., for the purpose of preventing clogging of the nozzle as well as for providing paper penetration (penetrants), improved drying (drying accelerators), and anti-cockling properties. In one embodiment, the humectant and/or water soluble compound is present in an amount ranging from 0.1% to 50%, e.g., an amount ranging from 1% to 50%, from 0.1% to 30%, from 1% to 30%, from 0.1% to 10%, or from 1% to 10%.

Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, isopropyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like;

and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the aqueous dispersions or inkjet ink composition disclosed herein. Biocides are important in preventing bacterial growth since bacteria are often larger than ink nozzles and can cause clogging as well as other printing problems. Examples of useful biocides include, but are not limited to, benzoate or sorbate salts, and isothiazolinones. In one embodiment, the biocides and/or fungicides are present in an amount ranging from 0.05% to 5% by weight, 0.05% to 2% by weight, 0.1% to 5% by weight, or 0.1% to 2% by weight, relative to the total weight of the composition.

One embodiment provides a composition comprising at least one pigment, a liquid vehicle, and at least one polymer comprising first monomers and second monomers selected from maleic anhydride, maleic acid, and salts, esters, imides, and amides thereof, as described herein (e.g., selected from maleic anhydride, maleic acid, and salts thereof). The first monomers can be selected from ethylenically unsaturated hydrophobic monomers comprise the formula $CH_2=CR^1R^2$, where $R^1$ and $R^2$ are independently selected from H, $C_1$-$C_{12}$ alkyl, $C_5$-$C_{20}$ aryl, $C_6$-$C_{20}$ aralkyl, and $C_6$-$C_{20}$ alkaryl, and the carbon atoms of $R^1$ and $R^2$ can be optionally substituted with at least one heteroatom selected from O, N, and S (e.g., $R^1$ and $R^2$ are independently selected from H, $C_1$-$C_{12}$ alkyl, $C_5$-$C_{20}$ aryl, $C_6$-$C_{20}$ aralkyl, and $C_6$-$C_{20}$ alkaryl or H, $C_1$-$C_{12}$ alkyl, $C_5$-$C_{20}$ aryl). In one embodiment, the first monomer is styrene. At least one portion of the second monomers can be functionalized with at least one organic group having a calcium index value greater than a calcium index value of phenylphosphonic acid. Additionally, or alternatively, the at least one polymer is crosslinked via the second monomers, e.g., via carboxylate-containing groups of the second monomers. In one embodiment, the polymer is crosslinked via at least one linkage selected from ester linkages, where the ester linkage can be derived from a reaction between an epoxy-containing compounds (e.g., di- and tri-glycidyl ether compounds such as trimethylolpropane polyglycidyl ether) and carboxylate-containing groups of the second monomers. In one embodiment, the composition consists essentially of the at least one (crosslinked) polymer, at least one pigment, and a liquid vehicle (e.g., water). In one embodiment, the composition (e.g., an aqueous dispersion) has a pH ranging from 8 to 11. In one embodiment, the composition (e.g., an aqueous dispersion) has an acid number ranging from 50 to 300.

EXAMPLES

Definitions

NaAL=sodium alendronate.
NaOH=sodium hydroxide.
SMA 2000=a low molecular weight styrene-maleic anhydride copolymer with an approximately 2:1 molar ratio of styrene and maleic anhydride (SMA® 2000 polymer, from Total Petrochemicals & Refining USA, Inc.).
SMA 3000=a low molecular weight styrene-maleic anhydride copolymer with an approximately 3:1 molar ratio of styrene and maleic anhydride (SMA® 3000 polymer, from Total Petrochemicals & Refining USA, Inc.)
SMA EF40=a low molecular weight styrene-maleic anhydride copolymer with an approximately 4:1 molar ratio of styrene and maleic anhydride (SMA® EF40 polymer, from Total Petrochemicals & Refining USA, Inc.).
Joncryl 683=a styrene-acrylic resin (Joncryl® 683 resin from BASF).
Acid ion-exchange resin=Purolite® C107E ion-exchange resin (from Purolite).
TMPTGE=Trimethylolpropane triglycidyl ether from Sigma Aldrich.
SURFYNOL 465=SURFYNOL® 465 surfactant, a non-ionic surfactant from Air Products.
TEGMBE=triethylene glycol monobutyl ether.
XIRAN® SZ25010 resin is a low molecular weight styrene-maleic anhydride copolymer with 25% maleic anhydride content, from Polyscope Polymers, BV.
XIRAN® SZ15010 resin is a low molecular weight styrene-maleic anhydride copolymer with 15% maleic anhydride content from Polyscope Polymers, BV.
DMAPA=3-(dimethylamino)-1-propylamine.

Polymer Examples

The Polymer-A to Polymer-D Examples describe the synthesis of polymers comprising first monomers selected from ethylenically unsaturated hydrophobic monomers, and second monomers selected from maleic anhydride, wherein a portion of the second monomers are functionalized with at least one organic group having a calcium index value greater than or equal to a calcium index value of phenylphosphonic acid. The Polymer-E and Polymer-G Examples describe the synthesis of a comparative polymer having first monomers selected from ethylenically unsaturated hydrophobic monomers, and second monomers selected from maleic anhydride, wherein none of the second monomers is functionalized with at least one organic group having a calcium index value greater than or equal to a calcium index value of phenylphosphonic acid. The Polymer-H Example describes the synthesis of a comparative polymer having monomers selected from ethylenically unsaturated hydrophobic and hydrophilic monomers, wherein none of monomers is selected from maleic anhydride, maleic acid, or salts, esters, imides, and amides thereof. The Polymer-I and Polymer-J Examples describe the synthesis of polymers comprising first monomers selected from ethylenically unsaturated hydrophobic monomers, and second monomers selected from maleic anhydride, wherein the polymers are hydrolyzed. Polymer-K is an example of a polymer comprising first monomers selected from ethylenically unsaturated hydrophobic monomers, and second monomers selected from maleic anhydride, wherein a portion of the second monomers are functionalized with at least one organic group having a calcium index value greater than or equal to a calcium index value of phenylphosphonic acid, wherein a portion of the second monomers are functionalized with (dimethylamino)-1-propylamine. Polymer-L Example describes a polymer comprising first monomers selected from ethylenically unsaturated hydrophobic monomers, and second monomers selected from maleic anhydride, wherein a portion of the second monomers are functionalized with (dimethylamino)-1-propylamine.

Polymer-A

To a 1 liter cylindrical reactor equipped with a temperature monitor, a stirrer, and a condenser, were added 100 g of SMA EF40 polymer powder and 320 g of deionized (DI)

water. A NaAL solution was prepared by dissolving sodium alendronate trihydrate (31.6 g) in the mixture of 122 g DI water and 58.4 g of 40 wt % NaOH solution. The NaAL solution was added to the reactor under stirring. The resultant mixture was heated at 90° C. for 11 h. During this time, the initial milky slurry gradually became clear and homogeneous. After cooling to room temperature, the solution was transferred to a stainless steel beaker, where its pH was adjusted by stirring the solution in the presence of an acid resin from an initial value of 11-12 until the pH was 8.5-10. Suction filtration through a glass frit to remove the ion exchange beads afforded a clear, colorless liquid. $^{31}$P NMR was used to determine the amount of bisphosphonate groups that were attached to the polymer. A final solution of Polymer-A was obtained: 19.2% solid, pH=9.60, and 13% of initially charged NaAL were covalently bonded to the polymer. For Polymer-A, the portion of the second monomers, which have been functionalized with bisphosphonate groups (having a calcium index value greater than a calcium index value of phenylphosphonic acid), is 13 mol % of the total second monomers.

Polymer-B

To a 1 liter cylindrical reactor equipped with a temperature monitor, a stirrer, and a condenser, were added 100 g of SMA EF40 polymer powder and 360 g of DI water. A NaAL solution was prepared by dissolving sodium alendronate trihydrate (56.9 g) in the mixture of 126 g DI water and 74 g of 40 wt % NaOH solution. The NaAL solution was added to the reactor under stirring. The resultant mixture was heated at 90° C. for 11 h. During this time, the initial milky slurry gradually became clear and homogeneous. After cooling to room temperature, the solution was transferred to a stainless steel beaker, where its pH was adjusted by stirring the solution in the presence of an acid resin from an initial value of 11-12 until the pH was 8.5-10. Suction filtration through a glass frit to remove the ion exchange beads afforded a clear, colorless liquid. $^{31}$P NMR was used to determine the amount of bisphosphonate groups that were attached to the polymer. A final solution of Polymer-B was obtained: 17.6% solid, pH=9.75, and 11% of initially charged NaAL were covalently bonded to the polymer. For Polymer-B, the portion of the second monomers, which have been functionalized with bisphosphonate groups (having a calcium index value greater than a calcium index value of phenylphosphonic acid), is 11 mol % of the total second monomers.

Polymer-C

To a 1 liter cylindrical reactor equipped with a temperature monitor, a stirrer, and a condenser, were added 80 g of SMA 3000 polymer powder and 200 g of DI water. A NaAL solution was prepared by dissolving sodium alendronate trihydrate (31.7 g) in the mixture of 122 g DI water and 29.3 g of 40 wt % NaOH solution. The NaAL solution was added to the reactor under stirring. The resultant mixture was heated at 80° C. for 11 h. During this time, the initial milky slurry gradually became clear and homogeneous. After cooling to room temperature, the solution was transferred to a stainless steel beaker, where its pH was adjusted by stirring the solution in the presence of an acid resin from an initial value of 11-12 until the pH was 8.5-10. Suction filtration through a glass frit to remove the ion exchange beads afforded a clear, colorless liquid. ICP analysis method was used to determine the amount of bisphosphonate groups that were attached to the polymer, wherein a small portion of polymer solution was first dialyzed against deionized water by using a dialysis tube with an appropriate molecular weight cut off (i.e., MWCO) (e.g., Spectro/Por® Dialysis Membrane, MWCO 2 kD). A final solution of Polymer-C was obtained: 12.7% solid, pH=9.62, and 11% of initially charged NaAL were covalently bonded to the polymer. For Polymer-C, the portion of the second monomers, which have been functionalized with bisphosphonate groups (having a calcium index value greater than a calcium index value of phenylphosphonic acid), is 11 mol % of the total second monomers.

Polymer-D

To a 1 liter cylindrical reactor equipped with a temperature monitor, a stirrer, and a condenser, were added 80 g of SMA 2000 polymer powder and 200 g of DI water. A NaAL solution was prepared by dissolving sodium alendronate trihydrate (42.5 g) in the mixture of 164 g DI water and 78.4 g of 40 wt % NaOH solution. The NaAL solution was added to the reactor under stirring. The resultant mixture was heated at 80° C. for 8 h. During this time, the initial milky slurry gradually became clear and homogeneous. After cooling to room temperature, the solution was transferred to a stainless steel beaker, where its pH was adjusted by stirring the solution in the presence of an acid resin from an initial value of 11-12 until the pH was 8.5-10. Suction filtration through a glass frit to remove the ion exchange beads afforded a clear, colorless liquid. ICP analysis method was used to determine the amount of bisphosphonate groups that were attached to the polymer, wherein a small portion of polymer solution was first dialyzed against deionized water by using a dialysis tube with an appropriate molecular weight cut off (i.e., MWCO) (e.g., Spectro/Por® Dialysis Membrane, MWCO 2 kD). A final solution of Polymer-D was obtained: 14.7% solid, pH=9.58, and 22% of initially charged NaAL were covalently bonded to the polymer. For Polymer-D, the portion of the second monomers, which have been functionalized with bisphosphonate groups (having a calcium index value greater than a calcium index value of phenylphosphonic acid), is 22 mol % of the total second monomers.

Polymer-E

Polymer-E was an aqueous solution of sodium salt of SMA 2000, which can be prepared via hydrolysis in the presence of NaOH solution. A final solution of Polymer-E was: 28.7% solid and pH 9.83.

Polymer-F

Polymer-F was an aqueous solution of sodium salt of SMA 3000, which can be prepared via hydrolysis in the presence of NaOH solution. A final solution of Polymer-F was: 17.2% solid and pH 9.75.

Polymer-G

Polymer-G was an aqueous solution of sodium salt of SMA EF40, which can be prepared via hydrolysis in the presence of NaOH solution and a small amount of Polymer-F (used as hydrolysis aid), wherein the amount of SMA 3000 added was 5.3 wt % of SMA EF40. A final solution of Polymer-G was: 20.9% solid and pH 9.90.

Polymer-H

Polymer-H was an aqueous solution of sodium salt of Joncryl 683, which can be prepared by neutralizing Joncryl 683 polymer with NaOH solution. A final solution of Polymer-H was: 22.6% solid and pH 8.84.

Polymer-I

To a 1 liter cylindrical reactor equipped with a temperature monitor, an overhead stirrer and a condenser, were added 285 g of XIRAN® SZ25010 resin powder (acid number, AN(SP)=285) and 1044 g of DI water. To the mixing slurry of polymer and water, 137.5 g of 40 wt % NaOH solution was added. The resultant mixture was heated at 95° C. for 10 h. During this time, the initial milky slurry gradually became clear and homogeneous, as the polymer was completely hydrolyzed resulting in a 22.1% solids solution of pH 10.1.

Polymer-J

To a 1 liter cylindrical reactor equipped with a temperature monitor, an overhead stirrer, and a condenser, were added 285 g of XIRAN® SZ15010 resin granules (acid number, AN(SP)=156) and 1169 g of DI water. To the mixing slurry of polymer and water, 75.3 g of 40 wt % NaOH solution was added. The resultant mixture was heated at 95° C. for 10 h. During this time, the initial milky slurry gradually became clear and homogeneous, as the polymer was completely hydrolyzed resulting in a 19.8% solids solution of pH 10.4.

Polymer-K

To a 0.5 L cylindrical reactor equipped with a temperature monitor, a stirrer, and a condenser, were added 30 g of SMA 3000 polymer powder, 0.91 mL of 3-(dimethylamino)-1-propylamine (DMAPA) from Sigma Aldrich, and 180 g of DI water. A NaAL solution was prepared by dissolving sodium alendronate trihydrate (2.6 g) in the mixture of 20 g DI water and 4.4 g of 40 wt % NaOH solution. The NaAL solution was added to the reactor under stirring. The resultant mixture was heated at 90° C. for 2 h. An additional 13.6 g of 40 wt % NaOH solution was added and the mixture was heated at 90° C. for 6 h. During this time, the initial milky slurry gradually became clear and homogeneous. A final solution of Polymer-K was obtained: 15.8% solid, pH=8.59. $^{31}$P NMR was used to determine the amount of bisphosphonate groups that were attached to the polymer, and $^{1}$H NMR was used to determine the amount of dimethylamino groups that were attached to the polymer. For Polymer-K, the portion of the second monomers, which have been functionalized with bisphosphonate groups (having a calcium index value greater than a calcium index value of phenylphosphonic acid), is 3.3 mol % of the total second monomers. The portion of the second monomers, which have been functionalized with dimethyl amino groups (organic group having the formula -A-N($R^3$)($R^4$)), is 8.5 mol % of the total second monomers.

Polymer-L

To a 0.5 L cylindrical reactor equipped with a temperature monitor, a stirrer, and a condenser, were added 30 g of SMA® EF40 polymer powder, 0.56 g of 3-(dimethylamino)-1-propylamine (DMAPA) from Sigma Aldrich, and 130 g of DI water. After mixing, 0.5 g of 40 wt % NaOH solution was added and the resultant mixture was heated at 94° C. for 2 h. An additional 10.6 g of 40 wt % NaOH solution was added and the mixture was heated at 94° C. for 8 h. During this time, the initial milky slurry gradually became clear and homogeneous. A final solution of Polymer-L was obtained: 14.1% solid, pH=8.59. $^{1}$H NMR was used to determine the amount of dimethylamino groups that were attached to the polymer. For Polymer-L the portion of the second monomers, which have been functionalized with dimethyl amino groups (organic group having the formula -A-N($R^3$)($R^4$)), is 8.4 mol % of the total second monomers.

Pigment Dispersion Examples

Pigment dispersion Examples PigDisp-1-5 are aqueous yellow pigment dispersions, which are stabilized by polymers. Pigment dispersion Examples PigDisp-6-9 are aqueous cyan pigment dispersions, which are stabilized by polymers. Pigment dispersion Examples PigDisp-10-21 are aqueous magenta pigment dispersions, which are stabilized by polymers. Pigment dispersion Examples PigDisp-22-24 are aqueous black pigment dispersions, which are stabilized by polymers. The pigment dispersions are prepared as follows.

PigDisP-1 and PigDisP-2

Polymer-G (560 g of solution, 20.9% solids in water) was combined with 724 g of DI water and 272 g of Pigment Yellow 74 (in the form of dry powder). This mixture was then sonicated at approximately 10° C. with a Misonix® probe sonicator for approximately 7 h to afford a low viscosity, yellow dispersion. A small portion of this dispersion (approximately 50 g) was centrifuged at 2,500 G for 20 minutes, and then decanted to isolate the product. A final solution of Polymer-G-dispersed yellow pigment, PigDisp-1, was obtained and had 15.5% solid and a mean particle size of 198 nm (determined by using a Microtrac® Particle Size Analyzer).

To the remaining dispersion (2014 g of solution, 18.2% solid content) were added 5.87 g of TMPTGE, 3.6 g of boric acid, and 190 g of DI water. The resultant mixture was heated at 65° C. for 4 h. After cooling to room temperature, the solution was diluted to 10% solid, followed by centrifugation at 2,500 G for 20 minutes. After that, the solution was purified and concentrated by diafiltration using a 3,000 MW cut-off polysulfone membrane to afford PigDisp-2: 16.5% solid and a mean particle size of 162 nm (determined by using a Microtrac® Particle Size Analyzer)

PigDisp-3

Polymer-A (829 g of solution, 19.2% solids in water) was combined with 917 g of DI water and 370 g of Pigment Yellow 74 (in the form of dry powder). This mixture was then sonicated at approximately 10° C. with a Misonix® probe sonicator for approximately 7 h to afford a low viscosity, yellow dispersion. The solution was then diluted to 10% solid, followed by centrifugation at 2,500 G for 20 minutes. After that, the solution was purified and concentrated by diafiltration using a 3,000 MW cut-off polysulfone membrane to afford PigDisp-3: 18.5% solid and a mean particle size of 170 nm (determined by using a Microtrac® Particle Size Analyzer).

PigDisp-4

Polymer-A (112 g of solution, 19.2% solids in water) was combined with 124 g of DI water and 50 g of Pigment Yellow 74 (in the form of dry powder). This mixture was then sonicated at approximately 10° C. with a Misonix® probe sonicator for approximately 1 h to afford a low viscosity, yellow dispersion. To the dispersion were added 1.21 g of TMPTGE (% $CO_2$ targeted=15%), 0.74 g of boric acid, and 144 g of DI water. The resultant mixture was heated at 65° C. for 4 h. After cooling to room temperature, the solution was centrifuged at 2,500 G for 20 minutes. After centrifugation, the solution, first diluted to 12% solid, was purified and concentrated by diafiltration using a 3,000 MW cut-off polysulfone membrane to afford PigDisp-4: 20.1% solid and a mean particle size of 177 nm (determined by using a Microtrac® Particle Size Analyzer).

PigDisp-5

PigDisp-5 is Pro-Jet™ APD1000 yellow colorant, an aqueous pigment yellow dispersion and commercially available from FUJIFILM Imaging Colorants, Inc. This dispersion is stabilized by using polyacrylates dispersants.

Evaluation of PigDisp 1-5

Dispersion Examples PigDisp-1-4 were evaluated by performing settling experiments, where these dispersions were left undisturbed on the bench over a period of time at room temperature. Their settling performance was ranked based on the following criteria:

Poor=Dispersion separates into two layers in ≤4 days, where the top layer contained little or reduced amount of pigment, while the pigment concentration in the bottom level is much higher than its initial concentration;

Good=Dispersion remains uniform (i.e., little or no layer separation) for 5 days or longer.

TABLE 1

| Dispersion | Polymer | Crosslinking | Settling Performance |
| --- | --- | --- | --- |
| PigDisp-1 | Polymer-G | No | Poor |
| PigDisp-2 | Polymer-G | Yes | Poor |
| PigDisp-3 | Polymer-A | No | Good |
| PigDisp-4 | Polymer-A | Yes | Good |

Table 1 showed that for both un-crosslinked and crosslinked samples, pigment dispersions, which are stabilized by Polymer-A, exhibited better settling performance than those dispersions stabilized by Polymer-G. The main difference between Polymer-A and Polymer-G is that Polymer-A is a functionalized SMA EF40 polymer, where bisphosphonate groups are attached to polymer, while Polymer-G does not contain any such functional groups. The calcium index value of phenylphosphonic acid is 2.53, which was measured by using Method A as described in U.S. Pat. No. 8,858,695, at col. 29, line 45 to col. 30, line 44, including a list of calcium index values for various compounds in Table 5A, the disclosure of which is incorporated herein by reference. Based on the previous measurement of —$CH_2(PO_3^{2-})_2$ (Table 5A of U.S. Pat. No. 8,858,695), the calcium index value for bisphosphonate group was determined to be about 3.45.

To take into account the ability of the polymer to bind polyvalent metal ions, e.g., magnesium and calcium, taking into account the functional group and hydrophobicity, among other factors, a magnesium sensitivity test was developed. The Mg-sensitivity test was conducted by (1) adding one drop (ca. 0.05 g) of the dispersion Examples PigDisp-3-5 (as is) into a series of 10-15 mL $MgCl_2$ solutions with varied levels of molar concentrations: 1.0 mM, 2.0 mM, 3.0 mM, and 5.0 mM; (2) shaking the samples and then allowing them to sit undisturbed for one hour at room temperature; and (3) recording the lowest molar concentration of $MgCl_2$ when the complete precipitation of pigment dispersion (i.e., clear separation of water and pigment precipitates) was observed. After testing all these examples, their $MgCl_2$ molar concentrations, at which pigments precipitated completely, were summarized in Table 2. The lower the $MgCl_2$ concentration required for precipitation, the greater the sensitivity towards magnesium and/or calcium ions, which can indicate capability for calcium and/or magnesium binding.

TABLE 2

| Dispersion | Polymer | Crosslinking | [$MgCl_2$], mM |
| --- | --- | --- | --- |
| PigDisp-3 | Polymer-A | No | 2.0 |
| PigDisp-4 | Polymer-A | Yes | 2.0 |
| PigDisp-5 | polyacrylates | Yes | >5.0 |

PigDisp-3 and PigDisp-4, containing Polymer-A, a bisphosphonate-functionalized SMA EF40 polymer, exhibited better calcium and/or magnesium binding capability than PigDisp-5, a polymer-stabilized dispersion, which does not contain any monomer selected from maleic anhydride, maleic acid, and salts, esters, imides, and amides thereof.

PigDisp-6

Polymer-A (202 g of solution, 19.2% solids in water) was combined with 223 g of DI water and 90 g of Pigment Blue 15:4 (in the form of dry powder). This mixture was then sonicated at approximately 10° C. with a Misonix® probe sonicator for approximately 1 h to afford a low viscosity, cyan dispersion. To the dispersion were added 4.37 g of TMPTGE (% $CO_2$ targeted=30%), 2.68 g of boric acid, and 257 g of DI water. The resultant mixture was heated at 65° C. for 5 h. After cooling to room temperature, the solution was first diluted to approximately 13% solid, followed by centrifugation at 2,500 G for 20 minutes. After centrifugation, the solution was purified and concentrated by diafiltration using a 3,000 MW cut-off polysulfone membrane to afford PigDisp-6: 20.7% solid and a mean particle size of 152 nm (determined by using a Microtrac® Particle Size Analyzer).

PigDisp-7

Polymer-B (220 g of solution, 17.6% solids in water) was combined with 205 g of DI water and 90 g of Pigment Blue 15:4 (in the form of dry powder). This mixture was then sonicated at approximately 10° C. with a Misonix® probe sonicator for approximately 1 h to afford a low viscosity, cyan dispersion. To the dispersion were added 4.37 g of TMPTGE (% $CO_2$ targeted=30%), 2.68 g of boric acid, and 257 g of DI water. The resultant mixture was heated at 65° C. for 5 h. After cooling to room temperature, the solution was first diluted to approximately 12% solid, followed by centrifugation at 2,500 G for 20 minutes. After centrifugation, the solution was purified and concentrated by diafiltration using a 3,000 MW cut-off polysulfone membrane to afford PigDisp-7: 20.4% solid and a mean particle size of 157 nm (determined by using a Microtrac® Particle Size Analyzer).

PigDisp-8

Polymer-E (47 g of solution, 28.7% solids in water) was combined with 213 g of DI water and 40 g of Pigment Blue 15:4 (as a presscake, the amount of which was determined by its solid content). This mixture was then sonicated at approximately 10° C. with a Misonix® probe sonicator for approximately 1 h to afford a low viscosity, cyan dispersion. The resultant solution was centrifuged at 2,500 G for 20 minutes, and then decanted to isolate the product. A final solution of Polymer-E-dispersed cyan pigment, PigDisp-8, was obtained: 13.7% solid and a mean particle size of 163 nm (determined by using a Microtrac® Particle Size Analyzer).

PigDisp-9

PigDisp-9 is Pro-Jet™ APD1000 cyan, an aqueous cyan pigment dispersion and commercially available from FUJIFILM Imaging Colorants, Inc. This dispersion is stabilized by using polyacrylates dispersants.

Evaluation of PigDisp 6-9

For these cyan dispersions, their Mg-sensitivity test was conducted by (1) adding one drop (ca. 0.05 g) of the dispersion Examples PigDisp-6-9 (as is) into a series of 10-15 mL $MgCl_2$ solutions with varied levels of molar concentrations: 1.0 mM, 2.0 mM, 3.0 mM, and 5.0 mM; (2) shaking the samples and then allowing them to sit undisturbed for one hour at room temperature; and (3) recording the lowest molar concentration of $MgCl_2$ when the complete precipitation of pigment dispersion (i.e., clear separation of water and pigment precipitates) was observed. After testing all these examples, their $MgCl_2$ molar concentrations, at which pigments precipitated completely, were summarized in Table 3. The lower the $MgCl_2$ concentration required for precipitation, the greater the sensitivity towards magnesium and/or calcium ions, which can indicate capability for calcium and/or magnesium binding.

TABLE 3

| Dispersion | Polymer | Crosslinking | [MgCl$_2$], mM |
|---|---|---|---|
| PigDisp-6 | Polymer-A | Yes | 2.0 |
| PigDisp-7 | Polymer-B | Yes | 2.0 |
| PigDisp-8 | Polymer-E | No | 3.0 |
| PigDisp-9 | polyacrylates | Yes | 5.0 |

PigDisp-6 and PigDisp-7, containing Polymer-A and Polymer-B respectively, a bisphosphonate-functionalized SMA EF40 polymer, exhibited better calcium and/or magnesium binding capability than PigDisp-8, an un-functionalized SMA 2000-dispersed cyan dispersion having no functional groups having a calcium index value greater than or equal to a calcium index value of phenylphosphonic acid, and PigDisp-5, a polymer-stabilized dispersion that does not contain any monomer selected from maleic anhydride, maleic acid, and salts, esters, imides, and amides thereof. Higher amounts of bisphosphonate groups are attached to SMA EF40 polymer in Polymer-B than Polymer-A.

PigDisp-10

Polymer-A (762 g of solution, 19.2% solids in water) was combined with 1444 g of DI water and 340 g of Pigment Violet 19 (in the form of dry powder). This mixture was then sonicated at approximately 10° C. with a Misonix® probe sonicator for approximately 7 h to afford a low viscosity, magenta dispersion. To the dispersion were added 10.7 g of TMPTGE, 6.53 g of boric acid, and 273 g of DI water. The resultant mixture was heated at 65° C. for 4 h. After cooling to room temperature, the solution was first diluted to approximately 10% solid, followed by centrifugation at 2,500 G for 20 minutes. After centrifugation, the solution was purified and concentrated by diafiltration using a 3,000 MW cut-off polysulfone membrane to afford PigDisp-10: 17.1% solid and a mean particle size of 168 nm (determined by using a Microtrac® Particle Size Analyzer).

PigDisp-11

Polymer-G (617 g of solution, 20.9% solids in water) was combined with 1228 g of DI water and 300 g of Pigment Violet 19 (in the form of dry powder). This mixture was then sonicated at approximately 10° C. with a Misonix® probe sonicator for approximately 6 h to afford a low viscosity, magenta dispersion. To the dispersion were added 9.14 g of TMPTGE, 5.61 g of boric acid, and 222 g of DI water. The resultant mixture was heated at 65° C. for 4 h. After cooling to room temperature, the solution was first diluted to approximately 10% solid, followed by centrifugation at 2,500 G for 20 minutes. After centrifugation, the solution was purified and concentrated by diafiltration using a 3,000 MW cut-off polysulfone membrane to afford PigDisp-11: 18.3% solid and a mean particle size of 161 nm (determined by using a Microtrac® Particle Size Analyzer).

PigDisp-12

Polymer-H (59 g of solution, 22.6% solids in water) was combined with 215 g of DI water and 40 g of Pigment Red 122 (as a presscake, the amount of which was determined by its solid content). This mixture was then sonicated at approximately 10° C. with a Misonix® probe sonicator for approximately 0.5 h to afford a low viscosity, cyan dispersion. The resultant solution was centrifuged at 2,500 G for 20 minutes, and then decanted to isolate the product. A final solution of Polymer-H-dispersed magenta pigment, PigDisp-12, was obtained: 14.0% solid and a mean particle size of 106 nm (determined by using a Microtrac® Particle Size Analyzer).

PigDisp-13

PigDisp-13 is Pro-Jet™ APD1000 magenta, an aqueous magenta pigment dispersion and commercially available from FUJIFILM Imaging Colorants, Inc. This dispersion is stabilized by using polyacrylates dispersants.

PigDisp-14-15

Polymer-A (34 g of solution, 19.2% solids in water) was combined with 38 g of DI water and 15 g of Pigment Violet 19 (in the form of dry powder). This mixture was then sonicated at approximately 10° C. with a Misonix® probe sonicator for approximately 0.5 h to afford a low viscosity, magenta dispersion. To the dispersion was added 43 g of DI water to afford PigDisp-14: 16.6% solid and a mean particle size of 184 nm (determined by using a Microtrac® Particle Size Analyzer).

To a separate reactor were added 35 g of PigDisp-14, 0.13 g of TMPTGE (% CO$_2$ targeted=20%) and 0.08 g of boric acid. The resultant mixture was heated at 65° C. for 5 h. After cooling to room temperature, the final solution of PigDisp-15 was obtained with a mean particle size of 200 nm (determined by using a Microtrac® Particle Size Analyzer).

PigDisp-16-17

Polymer-B (37 g of solution, 17.6% solids in water) was combined with 35 g of DI water and 15 g of Pigment Violet 19 (in the form of dry powder). This mixture was then sonicated at approximately 10° C. with a Misonix® probe sonicator for approximately 0.5 h to afford a low viscosity, magenta dispersion. To the dispersion was added 43 g of DI water to afford PigDisp-16: 16.6% solid and a mean particle size of 183 nm (determined by using a Microtrac® Particle Size Analyzer).

To a separate reactor were added 35 g of PigDisp-16, 0.13 g of TMPTGE (% CO$_2$ targeted=20%) and 0.08 g of boric acid. The resultant mixture was heated at 65° C. for 5 h. After cooling to room temperature, the final solution of PigDisp-17 was obtained with a mean particle size of 205 nm (determined by using a Microtrac® Particle Size Analyzer).

PigDisp-18-19

Polymer-D (44 g of solution, 14.7% solids in water) was combined with 27 g of DI water and 15 g of Pigment Violet 19 (in the form of dry powder). This mixture was then sonicated at approximately 10° C. with a Misonix® probe sonicator for approximately 0.5 h to afford a low viscosity, magenta dispersion. To the dispersion was added 43 g of DI water to afford PigDisp-18: 16.6% solid and a mean particle size of 171 nm (determined by using a Microtrac® Particle Size Analyzer).

To a separate reactor were added 35 g of PigDisp-18, 0.19 g of TMPTGE (% CO$_2$ targeted=17%) and 0.12 g of boric acid. The resultant mixture was heated at 65° C. for 5 h. After cooling to room temperature, the final solution of PigDisp-19 was obtained with a mean particle size of 220 nm (determined by using a Microtrac® Particle Size Analyzer).

PigDisp-20-21

Polymer-C (51 g of solution, 12.7% solids in water) was combined with 20 g of DI water and 15 g of Pigment Violet 19 (in the form of dry powder). This mixture was then sonicated at approximately 10° C. with a Misonix® probe sonicator for approximately 0.5 h to afford a low viscosity, magenta dispersion. To the dispersion was added 43 g of DI water to afford PigDisp-20: 16.6% solid and a mean particle size of 166 nm (determined by using a Microtrac® Particle Size Analyzer).

To a separate reactor were added 35 g of PigDisp-20, 0.16 g of TMPTGE (% $CO_2$ targeted=18%) and 0.10 g of boric acid. The resultant mixture was heated at 65° C. for 5 h. After cooling to room temperature, the final solution of PigDisp-21 was obtained with a mean particle size of 179 nm (determined by using a Microtrac® Particle Size Analyzer).

Evaluation of PigDisp 10-21

For these magenta dispersions, their Mg-sensitivity test was conducted by (1) first adding one drop (ca. 0.05 g) of the dispersion Examples PigDisp-10-21 (as is) into a series of 10-15 mL $MgCl_2$ solutions with varied levels of molar concentrations: 1.0 mM, 2.0 mM, 3.0 mM, and 5.0 mM; (2) upon initial shaking, leave the mixture sit undisturbed for one hour at room temperature; (3) record the lowest molar concentration of $MgCl_2$ when the complete precipitation of pigment dispersion (i.e., clear separation of water and pigment precipitates) was observed. After testing all these examples, their $MgCl_2$ molar concentrations, at which pigments precipitated completely, were summarized in Table 4. The lower the $MgCl_2$ concentration required for precipitation, the greater the sensitivity towards magnesium and/or calcium ions, which can indicate capability for calcium and/or magnesium binding.

TABLE 4

| Dispersion | Polymer | Crosslinking | [$MgCl_2$], mM |
| --- | --- | --- | --- |
| PigDisp-10 | Polymer-A | Yes | 2.0 |
| PigDisp-11 | Polymer-G | Yes | 5.0 |
| PigDisp-12 | Polymer-H | No | >5.0 |
| PigDisp-13 | polyacrylates | Yes | >5.0 |
| PigDisp-14 | Polymer-A | No | 2.0 |
| PigDisp-15 | Polymer-A | Yes | 2.0 |
| PigDisp-16 | Polymer-B | No | 2.0 |
| PigDisp-17 | Polymer-B | Yes | 2.0 |
| PigDisp-18 | Polymer-D | No | 3.0 |
| PigDisp-19 | Polymer-D | Yes | 3.0 |
| PigDisp-20 | Polymer-C | No | 3.0 |
| PigDisp-21 | Polymer-C | Yes | 3.0 |

PigDisp-10 and PigDisp-14-17, containing Polymer-A and Polymer-B respectively, a bisphosphonate-functionalized SMA EF40 polymer, and PigDisp-18-19, containing Polymer-D, a bisphosphonate-functionalized SMA 2000 polymer, and PigDisp-20-21, containing Polymer-C, a bisphosphonate-functionalized SMA 3000 polymer, exhibited better calcium and/or magnesium binding capability than PigDisp-11, an un-functionalized SMA EF40-stabilized magenta dispersion having no functional groups having a calcium index value greater than or equal to a calcium index value of phenylphosphonic acid, and PigDisp-12-13, a polymer-stabilized dispersion that does not contain any monomer selected from maleic anhydride, maleic acid, and salts, esters, imides, and amides thereof. Higher amount of bisphosphonate groups are attached to SMA EF40 polymer in Polymer-B than Polymer-A.

For the magenta dispersions, a Ca-sensitivity test was also conducted by (1) adding one drop (ca. 0.05 g) of the dispersion Examples PigDisp-10 and PigDisp-12-17 (as is) into a series of 10-15 mL $CaCl_2$ solutions with varied levels of molar concentrations: 1.0 mM, 2.0 mM, 3.0 mM, and 5.0 mM; (2) shaking the samples and allowing them to sit undisturbed for one hour at room temperature; and (3) recording the lowest molar concentration of $CaCl_2$ when complete precipitation of pigment dispersion (i.e., clear separation of water and pigment precipitates) was observed. Their $CaCl_2$ molar concentrations of these samples are summarized in Table 5. The lower the $CaCl_2$ concentration required for precipitation, the greater the sensitivity towards magnesium and/or calcium ions, which can indicate capability for calcium and/or magnesium binding.

TABLE 5

| Dispersion | Polymer | Crosslinking | [$CaCl_2$], mM |
| --- | --- | --- | --- |
| PigDisp-10 | Polymer-A | Yes | 2.0 |
| PigDisp-12 | Polymer-H | No | >5.0 |
| PigDisp-13 | polyacrylates | Yes | >5.0 |
| PigDisp-14 | Polymer-A | No | 2.0 |
| PigDisp-15 | Polymer-A | Yes | 2.0 |
| PigDisp-16 | Polymer-B | No | 2.0 |
| PigDisp-17 | Polymer-B | Yes | 2.0 |

For the magenta dispersions, the Ca-sensitivity test showed the same results as those based on the Mg-sensitivity test (Table 4). PigDisp-10 and PigDisp-14-17, containing Polymer-A and Polymer-B respectively, a bisphosphonate-functionalized SMA EF40 polymer, exhibited better calcium and/or magnesium binding capability than PigDisp-12-13, a polymer-stabilized dispersion that does not contain any monomer selected from maleic anhydride, maleic acid, and salts, esters, imides, and amides thereof.

PigDisp-22

Polymer-A (112 g of solution, 19.2% solids in water) was combined with 124 g of DI water and 50 g of Black Pearls 900 (from Cabot Corporation). This mixture was then sonicated at approximately 10° C. with a Misonix® probe sonicator for approximately 10 min to afford a low viscosity, black dispersion. To the dispersion were added 0.90 g of TMPTGE (% $CO_2$ targeted=10%), 0.56 g of boric acid, and 144 g of DI water. The resultant mixture was heated at 65° C. for 5 h. After cooling to room temperature, the solution was first diluted to approximately 13% solid, followed by centrifugation at 2,500 G for 20 minutes. After centrifugation, the solution was purified and concentrated by diafiltration using a 3,000 MW cut-off polysulfone membrane to afford PigDisp-22: 20.6% solid and a mean particle size of 102 nm (determined by using a Microtrac® Particle Size Analyzer).

PigDisp-23

Polymer-G (772 g of solution, 20.9% solids in water) was combined with 999 g of DI water and 375 g of Black Pearls 900 (from Cabot Corporation). This mixture was then sonicated at approximately 10° C. with a Misonix® probe sonicator for approximately 1 h to afford a low viscosity, black dispersion. To the dispersion were added 8.1 g of TMPTGE, 4.967 g of boric acid, and 750 g of DI water. The resultant mixture was heated at 65° C. for 4 h. After cooling to room temperature, the solution was first diluted to approximately 10% solid, followed by centrifugation at 2,500 G for 20 minutes. After centrifugation, the solution was purified and concentrated by diafiltration using a 3,000 MW cut-off polysulfone membrane to afford PigDisp-23: 17.1% solid and a mean particle size of 101 nm (determined by using a Microtrac® Particle Size Analyzer).

PigDisp-24

PigDisp-24 is Pro-Jet™ APD1000 black, an aqueous black pigment dispersion and commercially available from FUJIFILM Imaging Colorants, Inc. This dispersion is stabilized by using polyacrylates dispersants.

Evaluation of PigDisp 22-24

For these black dispersions, their Mg-sensitivity test was conducted by (1) adding one drop (ca. 0.05 g) of the dispersion Examples PigDisp-22-24 (as is) into a series of 10-15 mL $MgCl_2$ solutions with varied levels of molar concentrations: 1.0 mM, 2.0 mM, 3.0 mM, and 5.0 mM; (2) shaking the samples and then allowing them to sit undisturbed for four hour at room temperature; and (3) recording the lowest molar concentration of $MgCl_2$ when the complete precipitation of pigment dispersion (i.e., clear separation of water and pigment precipitates) was observed. After testing all these examples, their $MgCl_2$ molar concentrations, at which pigments precipitated completely, were summarized in Table 6. The lower the $MgCl_2$ concentration required for precipitation, the greater the sensitivity towards magnesium and calcium ions, which can indicate capability for calcium and/or magnesium binding.

TABLE 6

| Dispersion | Polymer | Crosslinking | $[MgCl_2]$, mM |
|---|---|---|---|
| PigDisp-22 | Polymer-A | Yes | 2.0 |
| PigDisp-23 | Polymer-G | Yes | 3.0 |
| PigDisp-24 | polyacrylates | Yes | 5.0 |

PigDisp-22, containing Polymer-A, a bisphosphonate-functionalized SMA EF40 polymer, exhibited better calcium and/or magnesium binding capability than PigDisp-23, an un-functionalized SMA EF40-stabilized magenta dispersion having no functional groups having a calcium index value greater than or equal to a calcium index value of phenylphosphonic acid, and PigDisp-24, a polymer-stabilized dispersion that does not contain any monomer selected from maleic anhydride, maleic acid, and salts, esters, imides, and amides thereof.

PigDisp-25

Polymer-K (136 g of solution, 15.8% solids in water, pH=8.59) was combined with 90 g of DI water and 50 g of Pigment Yellow 74 (in the form of dry powder). This mixture was then sonicated at approximately 10° C. with a Misonix® probe sonicator for approximately 3 h to afford a low viscosity, yellow dispersion. To the dispersion (274 g of solution, 25.2% solids content) were added 1.41 g of TMPTGE (% $CO_2$ targeted=14%), 0.89 g of boric acid, and 140 g of DI water. The resultant mixture was heated at 65° C. for 4 h. After cooling to room temperature, the solution was diluted to 10% solid, followed by centrifugation at 2,500 G for 20 minutes. After that, the solution was purified and concentrated by diafiltration using a 3,000 MW cut-off polysulfone membrane to afford a yellow PigDisp-25 dispersion: 19.34% solids pH=9.38, and a mean particle size of 158 nm (determined by using a Microtrac® Particle Size Analyzer). For this yellow dispersion, its Mg-sensitivity test was conducted as described in the evaluation of PigDisp 1-5. PigDisp-25, containing Polymer-K, a bisphosphonate-functionalized SMA 3000 polymer, exhibited better calcium and/or magnesium binding capability than PigDisp-5, a yellow polymer-stabilized dispersion, which does not contain any monomer selected from maleic anhydride, maleic acid, and salts, esters, imides, and amides thereof.

PigDisp-26 to PigDisp-34

Dispersions PigDisp-26 to PigDisp-34 were prepared to investigate the effect of stability upon crosslinking. Stability is assessed with a solvent stability test, which were conducted on the dispersions according to the following method:

A 50 μL solvent drop was placed on a microscope glass slide, then a 5 μL dispersion droplet (at approximately 18-20% solids loading) was placed on top of the solvent drop. A microscope cover was used to flatten the droplet and the appearance of the colorant particles was recorded. When the dispersion has good compatibility, the pigment particles will mix and flow with the liquid and color the liquid area. When the dispersion has bad compatibility, the pigment particles will agglomerate and not spread together with the liquid.

Table 7 below lists the acid number and percentage of $CO_2$ targeted ("% $CO_2$") for the polymers of each dispersion.

TABLE 7

| Dispersion | AN(SP) | AN (xlink) | % $CO_2$ targeted |
|---|---|---|---|
| PigDisp26 | 285 | 285 | 0 |
| PigDisp27 | 285 | 285 | 0 |
| PigDisp28 | 285 | 199 | 30 |
| PigDisp29 | 285 | 285 | 0 |
| PigDisp30 | 285 | 285 | 0 |
| PigDisp31 | 285 | 199 | 30 |
| PigDisp32 | 156 | 156 | 0 |
| PigDisp33 | 156 | 156 | 0 |
| PigDisp34 | 156 | 125 | 20 |

PigDisp-26

Polymer-I (298 g of solution, 22.1% solids in water) was combined with 424 g of DI water and 198 g of carbon black prepared according to the method described in U.S. Pat. No. 9,388,300 and having the following properties: BET surface area=265 $m^2/g$, STSA=197 $m^2/g$, OAN=175 mL/100 g, and COAN=135 mL/100 g. This mixture was then sonicated at approximately 10° C. with a Misonix® probe sonicator for approximately 2 h to afford a low viscosity, black dispersion at 25.8% solids, pH=9.80.

PigDisp-27

PigDisp-26 (250 g) was diluted to approximately 12% solids, followed by centrifugation at 2,500 G for 20 min. After centrifugation, the solution was purified and concentrated by diafiltration using a 3,000 MW cut-off polysulfone membrane to afford the noncrosslinked carbon black PigDisp-27 dispersion: 20.8% solids, pH=9.41, and a mean particle size of 146 nm (determined by using a Microtrac® Particle Size Analyzer).

PigDisp-28

To a 250 g portion of PigDisp-26 were added 2.80 g of TMPTGE, 2.58 g of boric acid, and 115.16 g of DI water. The resultant mixture was heated at 65° C. for 5 h. After cooling to room temperature, the solution was diluted to approximately 12% solids, followed by centrifugation at 2,500 G for 20 minutes. After centrifugation, the solution was purified and concentrated by diafiltration using a 3,000 MW cut-off polysulfone membrane to afford a cross-linked carbon black dispersion: 18.10% solids, pH=8.83, and a mean particle size of 148 nm (determined by using a Microtrac® Particle Size Analyzer).

Evaluation of PigDisp-27-28

The solvent stability test was applied to PigDisp-27 (non-crosslinked carbon black dispersion) and PigDisp-28 (crosslinked carbon black dispersion) with various solvents. The results are listed in Table 8 below.

TABLE 8

| Solvent | PigDisp-27 (non-crosslinked) | PigDisp-28 (crosslinked) |
|---|---|---|
| dipropylene glycol | Agglomerated | good spread |
| 2-pyrollidone | Agglomerated | good spread |
| triethylene glycol monobutyl ether | Agglomerated | good spread |
| 1,2-hexanediol | Agglomerated | good spread with a few agglomerates |
| 2-methyl-1,3-propanediol | Agglomerated | good spread with a few agglomerates |
| 1,4-butanediol | Agglomerated | good spread |
| tetraethylene glycol | Agglomerated | good spread |

The non-crosslinked dispersion PigDisp-27 immediately destabilized when exposed to the solvents listed in Table 8, as evidenced by large agglomerates of pigment particles crashing out onto the microscope slide. In contrast, crosslinked dispersion PigDisp-28 spread out and dispersed in the solvent, indicative of its stability when exposed to the solvents.

The contrast in solvent stability is also shown in FIGS. 1A and 1B, which are photographs of PigDisp-27 and PigDisp-28, respectively, upon exposure to dipropylene glycol on the microscopic slide. It can be seen that the non-crosslinked dispersion PigDisp-27 in FIG. 1A is agglomerated whereas the crosslinked dispersion PigDisp-28 in FIG. 1B is evenly spread throughout the slide with no visible agglomeration.

PigDisp-29

Polymer-I (124 g of solution, 22.1% solids in water, pH=10.1) was combined with 135.6 g of DI water and 118 g of Pigment Green 7 presscake (42.9% solids). This mixture was then sonicated at approximately 10° C. with a Misonix® probe sonicator for approximately 2 h to afford a low viscosity, green dispersion at 25.2% solids.

PigDisp-30

PigDisp-29 (75 g) was diluted to approximately 15% solids, followed by centrifugation at 2,500 G for 10 min. After centrifugation, the solution was purified and concentrated by diafiltration using a 3,000 MW cut-off polysulfone membrane to afford the noncrosslinked green PigDisp-30 dispersion: 19.10% solids, pH=9.21, and a mean particle size of 147 nm (determined by using a Microtrac® Particle Size Analyzer).

PigDisp-31

To a 150 g portion of PigDisp-29 were added 2.04 g of TMPTGE, 3.13 g of boric acid, and 41 g of DI water. The resultant mixture was heated at 65° C. for 5 h. After cooling to room temperature, the solution was diluted to approximately 15% solids, followed by centrifugation at 2,500 G for 10 minutes. After centrifugation, the solution was purified and concentrated by diafiltration using a 3,000 MW cut-off polysulfone membrane to afford a crosslinked green PigDisp-31 dispersion: 17.87% solids, pH=8.46, and a mean particle size of 151 nm (determined by using a Microtrac® Particle Size Analyzer).

Evaluation of PigDisp-30-31

The solvent stability test was applied to PigDisp-30 (non-crosslinked green dispersion) and PigDisp-31 (crosslinked green dispersion) with various solvents. The results are listed in Table 9 below.

TABLE 9

| Solvent | PigDisp-30 (non-crosslinked) | Pig-Disp-31 (crosslinked) |
|---|---|---|
| dipropylene glycol | agglomerated | good spread |
| 2-pyrollidone | agglomerated | good spread |
| triethylene glycol monobutyl ether | agglomerated | good spread |
| 1,2-hexanediol | spread with some agglomerates | good spread |
| 2-methyl-1,3-propanediol | agglomerated | good spread |
| 1,4-butanediol | agglomerated | good spread |
| tetraethylene glycol | agglomerated | good spread |

The non-crosslinked dispersion PigDisp-30 immediately destabilized when exposed to the solvents listed in Table 9, as evidenced by large agglomerates of pigment particles crashing out onto the microscope slide. In contrast, crosslinked dispersion PigDisp-31 spread out and dispersed in the solvent, indicative of its stability when exposed to the solvents.

PigDisp-32

Polymer-J (90 g of solution, 19.8% solids in water, pH=10.4) was combined with 160 g of DI water and 40 g of Pigment Violet 19 (in powder form). This mixture was then sonicated at approximately 10° C. with a Misonix® probe sonicator for approximately 2 h to afford a low viscosity, magenta dispersion at 20.1% solids.

PigDisp-33

PigDisp-32 (130 g) was first diluted to approximately 15% solids, followed by centrifugation at 2,500 G for 10 minutes. After centrifugation, the solution was purified and concentrated by diafiltration using a 3,000 MW cut-off polysulfone membrane to afford a non-crosslinked magenta PigDisp-33 dispersion: 22.9% solids, pH=8.8, and a mean particle size of 162 nm (determined by using a Microtrac® Particle Size Analyzer).

PigDisp-34

To a 130 g portion of PigDisp-32 were added 0.86 g of TMPTGE and 1.24 g of boric acid. The resultant mixture was heated at 65'C for 5 h. After cooling to room temperature, the solution was first diluted to approximately 15% solid, followed by centrifugation at 2,500 G for 10 minutes. After centrifugation, the solution was purified and concentrated by diafiltration using a 3,000 MW cut-off polysulfone membrane to afford a cross-linked magenta PigDisp-34 dispersion: 18.56% solids, pH=8.62, and a mean particle size of 166 nm (determined by using a Microtrac® Particle Size Analyzer).

Evaluation of PigDisp-33-34

The solvent stability test was applied to PigDisp-33 (non-crosslinked magenta dispersion) and PigDisp-34 (crosslinked magenta dispersion) with various solvents. The results are listed in Table 10 below.

TABLE 10

| Solvent | PigDisp-33 (non-crosslinked) | PigDisp-34 (crosslinked) |
|---|---|---|
| dipropylene glycol | agglomerated | good spread |
| 2-pyrollidone | agglomerated | good spread |
| triethylene glycol monobutyl ether | agglomerated | good spread |
| 1,2-hexanediol | agglomerated | good spread |
| 2-methyl-1,3-propanediol | agglomerated | good spread |
| 1,4-butanediol | agglomerated | good spread |
| tetraethylene glycol | agglomerated | good spread |

The non-crosslinked dispersion PigDisp-33 immediately destabilized when exposed to the solvents listed in Table 10, as evidenced by large agglomerates of pigment particles crashing out onto the microscope slide. In contrast, cross-linked dispersion PigDisp-34 spread out and dispersed in the solvent, indicative of its stability when exposed to the solvents.

PigDisP-35

Polymer-L (152 g of solution, 14.1% solids in water) was combined with 72.5 g of DI water and 50 g of Pigment Yellow 74 (in the form of dry powder). This mixture was then sonicated at approximately 10° C. with a Misonix® probe sonicator for approximately 3 h to afford a low viscosity, yellow dispersion. To the dispersion (288 g of solution, 26% solid content) were added 1.13 g of TMPTGE, 0.70 g of boric acid, and 140 g of DI water. The resultant mixture was heated at 65° C. for 4 h. After cooling to room temperature, the solution was diluted to 10% solid, followed by centrifugation at 2,500 G for 20 minutes. After that, the solution was purified and concentrated by diafiltration using a 3,000 MW cut-off polysulfone membrane to afford yellow PigDisp-35: 20.16% solid and a mean particle size of 165 nm (determined by using a Microtrac® Particle Size Analyzer).

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A composition comprising:
   at least one pigment;
   a liquid vehicle; and
   at least one polymer encapsulating the at least one pigment wherein the at least one polymer comprises first monomers selected from ethylenically unsaturated hydrophobic monomers, and second monomers selected from maleic anhydride, maleic acid, and salts, esters, imides, and amides thereof, wherein the ethylenically unsaturated hydrophobic monomers comprise the formula $CH_2=CR^1R^2$, where $R^1$ and $R^2$ are independently selected from H, $C_1$-$C_{12}$ alkyl, $C_5$-$C_{20}$ aryl, and $C_6$-$C_{20}$ alkaryl, and the carbon atoms of $R^1$ and $R^2$ can be optionally substituted with at least one heteroatom selected from O, N, and S, and
   wherein the at least one polymer is crosslinked through carboxylate groups of the second monomers,
   wherein the first monomers are present in the at least one polymer in an amount ranging from 40 to 90 mol % relative to the at least one polymer and the second monomers are present in the at least one polymer in an amount ranging from 10 to 60 mol % relative to the at least one polymer, and
   wherein the at least one polymer has an acid number ranging from 90 to 325 according to the following equation:

AN(xlink)=AN(SP)–(% CO2 targeted)×AN(SP)

wherein "AN(xlink)" is the acid number of the at least one polymer, which is crosslinked, "AN(SP)" is the acid number of the starting polymer and "% CO2 targeted" is the percentage of carboxylate groups of the second monomers targeted for crosslinking.

2. The composition of claim 1, wherein the second monomers are selected from maleic anhydride, maleic acid, and salts thereof.

3. The composition of claim 1, wherein the at least one polymer is crosslinked through at least 10% of carboxylate groups of the second monomer.

4. The composition of claim 1, wherein the at least one polymer is crosslinked via at least one linkage selected from amide, imide, and ester linkages.

5. The composition of claim 1, wherein the ethylenically unsaturated hydrophobic monomers comprise the formula $CH_2=CR^1R^2$, wherein $R^1$ and $R^2$ are independently selected from H, $C_1$-$C_{12}$ alkyl, $C_5$-$C_{20}$ aryl, $C_6$-$C_{20}$ aralkyl, and $C_6$-$C_{20}$ alkaryl.

6. The composition of claim 1, wherein the ethylenically unsaturated hydrophobic monomers are selected from styrene, α-methyl styrene, ethylene, propylene, 1-butylene, isobutylene, butadiene, and methyl vinyl ether.

7. The composition of claim 1, wherein the ethylenically unsaturated hydrophobic monomers are selected from styrene.

8. The composition of claim 1, wherein the at least one polymer has an acid number ranging from 90 to 250.

9. The composition of claim 1, wherein the at least one polymer has an acid number ranging from 90 to 200.

10. The composition of claim 1, wherein the composition has a pH ranging from 8 to 11.

11. The composition of claim 1, wherein a portion of the second monomers are functionalized with at least one organic group comprising the formula selected from —$CH_2CH_2$—$N(CH_3)_2$, —$CH_2CH_2CH_2$—$N(CH_3)_2$, —$CH(CH_3)CH_2$—$N(CH_3)_2$, —$CH_2CH_2CH_2CH_2$—$N(CH_3)_2$, —$CH_2CH_2$—$N(CH_2CH_3)_2$, —$CH_2CH_2CH_2$—$N(CH_2CH_3)_2$, —$CH_2CH_2CH_2CH_2$—$N(CH_2CH_3)_2$, —$CH_2CH_2$—$NHCH_2CH_2OH$, —$CH_2CH_2$—$N(CH_2CH_2OH)_2$, and

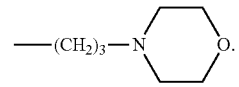

12. The composition of claim 1, wherein a portion of the second monomers are functionalized with at least one organic group comprising the formula -A-$N^+(R^3)(R^4)(R^5)$, wherein $R^3$, $R^4$, and $R^5$ are independently selected from H, $C_1$-$C_{10}$ alkyl, $C_4$-$C_{18}$ aryl, $C_4$-$C_{18}$ heteroaryl, and $C_3$-$C_{20}$ heterocycloalkyl, and A is selected from $C_1$-$C_{10}$ alkylene, $C_3$-$C_{20}$ cycloalkylene, $C_3$-$C_{20}$ heterocycloalkylene, arylene, heteroarylene, and $C_2$-$C_{20}$ ether.

13. The composition of claim 1, wherein the at least one pigment is unmodified.

14. The composition of claim 1, wherein the at least one pigment is self-dispersed.

15. The composition of claim 1, wherein the liquid vehicle is water.

16. The composition of claim 1, wherein the composition is an aqueous dispersion.

17. The composition of claim 1, further comprising at least one surfactant.

18. The composition of claim 1, further comprising at least one durability polymer.

19. The composition of claim 1, further comprising at least one viscosity modifier.

20. The composition of claim 1, further comprising at least one polymeric binder.

21. The composition of claim 1, wherein the composition is an inkjet ink composition.

22. The composition of claim 1, wherein a portion of the second monomers are functionalized with at least one organic group comprising the formula -A-N($R^3$)($R^4$), wherein $R^3$ and $R^4$ are independently selected from H, $C_1$-$C_{10}$ alkyl, $C_4$-$C_{18}$ aryl, $C_4$-$C_{18}$ heteroaryl, and $C_3$-$C_{20}$ heterocycloalkyl, and A is selected from $C_1$-$C_{10}$ alkylene, $C_3$-$C_{20}$ cycloalkylene, $C_3$-$C_{20}$ heterocycloalkylene, arylene, heteroarylene, and $C_2$-$C_{20}$ ether.

23. The composition of claim 22, wherein the at least one organic group is bonded to the second monomer via at least one linkage selected from amide, imide, and ester bonds.

24. The composition of claim 1, wherein the at least one polymer is crosslinked via at least one linkage selected from ester linkages.

25. The composition of claim 24, wherein the ester linkage is derived from a reaction between epoxy-containing compounds and carboxylate-containing groups of the second monomers.

26. The composition of claim 25, wherein the epoxy-containing compounds are selected from di- and tri-glycidyl ether compounds.

27. The composition of claim 25, wherein the epoxy-containing compounds are selected from trimethylolpropane triyglycidyl ether.

28. A composition comprising:
at least one pigment;
a liquid vehicle; and
at least one polymer encapsulating the at least one pigment wherein the at least one polymer comprises first monomers selected from ethylenically unsaturated hydrophobic monomers, and second monomers selected from maleic anhydride, maleic acid, and salts, esters, imides, and amides thereof, wherein the ethylenically unsaturated hydrophobic monomers comprise the formula $CH_2$=$CR^1R^2$, where $R^1$ and $R^2$ are independently selected from H, $C_1$-$C_{12}$ alkyl, $C_5$-$C_{20}$ aryl, and $C_6$-$C_{20}$ alkaryl, and the carbon atoms of $R^1$ and $R^2$ can be optionally substituted with at least one heteroatom selected from O, N, and S, and
wherein the at least one polymer is crosslinked through carboxylate groups of the second monomers, and
wherein a portion of the second monomers are functionalized with at least one organic group comprising the formula -A-N($R^3$)($R^4$), wherein $R^3$ and $R^4$ are independently selected from H, $C_1$-$C_{10}$ alkyl, $C_4$-$C_{18}$ aryl, $C_4$-$C_{18}$ heteroaryl, and $C_3$-$C_{20}$ heterocycloalkyl, and A is selected from $C_1$-$C_{10}$ alkylene, $C_3$-$C_{20}$ cycloalkylene, $C_3$-$C_{20}$ heterocycloalkylene, arylene, heteroarylene, and $C_2$-$C_{20}$ ether.

29. A composition comprising:
at least one pigment;
a liquid vehicle; and
at least one polymer encapsulating the at least one pigment wherein the at least one polymer comprises first monomers selected from ethylenically unsaturated hydrophobic monomers, and second monomers selected from maleic anhydride, maleic acid, and salts, esters, imides, and amides thereof, wherein the ethylenically unsaturated hydrophobic monomers comprise the formula $CH_2$=$CR^1R^2$, where $R^1$ and $R^2$ are independently selected from H, $C_1$-$C_{12}$ alkyl, $C_5$-$C_{20}$ aryl, and $C_6$-$C_{20}$ alkaryl, and the carbon atoms of $R^1$ and $R^2$ can be optionally substituted with at least one heteroatom selected from O, N, and S, and
wherein the at least one polymer is crosslinked through carboxylate groups of the second monomers, and
wherein a portion of the second monomers are functionalized with at least one organic group comprising the formula selected from —$CH_2CH_2$—N($CH_3$)$_2$, —$CH_2CH_2CH_2$—N($CH_3$)$_2$, —CH($CH_3$)$CH_2$—N($CH_3$)$_2$, —$CH_2CH_2CH_2CH_2$—N($CH_3$)$_2$, —$CH_2CH_2$—N($CH_2CH_3$)$_2$, —$CH_2CH_2CH_2$—N($CH_2CH_3$)$_2$, —$CH_2CH_2CH_2CH_2$—N($CH_2CH_3$)$_2$, —$CH_2CH_2$—NH$CH_2CH_2$OH, —$CH_2CH_2$—N($CH_2CH_2$OH)$_2$, and

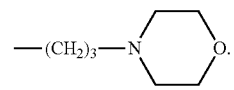

UNITED STATES PATENT AND TRADEMARK OFFICE
CERTIFICATE OF CORRECTION

PATENT NO. : 10,233,342 B2
APPLICATION NO. : 15/950718
DATED : March 19, 2019
INVENTOR(S) : Jinqi Xu et al.

It is certified that error appears in the above-identified patent and that said Letters Patent is hereby corrected as shown below:

On the Title Page

Fifth inventor, at item (75) Inventors: "Alexander I. Shaknovich" should read -- Alexander I. Shakhnovich --

Signed and Sealed this
Fifteenth Day of October, 2019

Andrei Iancu
*Director of the United States Patent and Trademark Office*